United States Patent

Hirota et al.

[11] Patent Number: 5,867,285
[45] Date of Patent: Feb. 2, 1999

[54] IMAGE PROCESSOR

[75] Inventors: Yoshihiko Hirota; Hiroyuki Suzuki, both of Toyokawa, Japan

[73] Assignee: Minolta Co., Ltd., Osaka, Japan

[21] Appl. No.: 819,456

[22] Filed: Mar. 17, 1997

[30] Foreign Application Priority Data

Mar. 18, 1996 [JP] Japan .................................. 8-061107

[51] Int. Cl.⁶ .................................................. G06K 9/46
[52] U.S. Cl. ........................... 358/522; 358/520; 382/167
[58] Field of Search ................................... 382/119, 167, 382/168; 358/505, 511, 512, 513, 514, 515, 518, 519, 522, 532; 348/751, 756, 757; 349/8, 57

[56] References Cited

U.S. PATENT DOCUMENTS

| | | | |
|---|---|---|---|
| 3,311,332 | 5/1994 | Imao et al. | 358/520 |
| 4,978,226 | 12/1990 | Moriya et al. | 358/76 |
| 5,165,071 | 11/1992 | Moriya et al. | 358/443 |
| 5,181,105 | 1/1993 | Udagawa et al. | 358/80 |
| 5,408,343 | 4/1995 | Suqiura et al. | 358/520 |
| 5,436,739 | 7/1995 | Imao et al. | 358/518 |
| 5,541,742 | 7/1996 | Imao et al. | 358/518 |
| 5,557,688 | 9/1996 | Nakamura | 382/162 |

*Primary Examiner*—Leo H. Boudreau
*Assistant Examiner*—Sheela C. Chawan
*Attorney, Agent, or Firm*—McDermott, Will & Emery

[57] ABSTRACT

In an image processing apparatus, a color image is read with pixels aligned along a direction to provide first color data on the color image. The first color data includes red, green and blue data at each pixel. A first operator calculates first chroma data according to the first color data. On the other hand, a phase shift device generates second color data by shifting a phase of red data and by shifting a phase of blue data in the first color data, and a second operator calculates second chroma data according to the second color data. A selector selects chroma data having a lower chroma, and a black edge of a character a the color image is discriminated according to the selected chroma data.

11 Claims, 24 Drawing Sheets

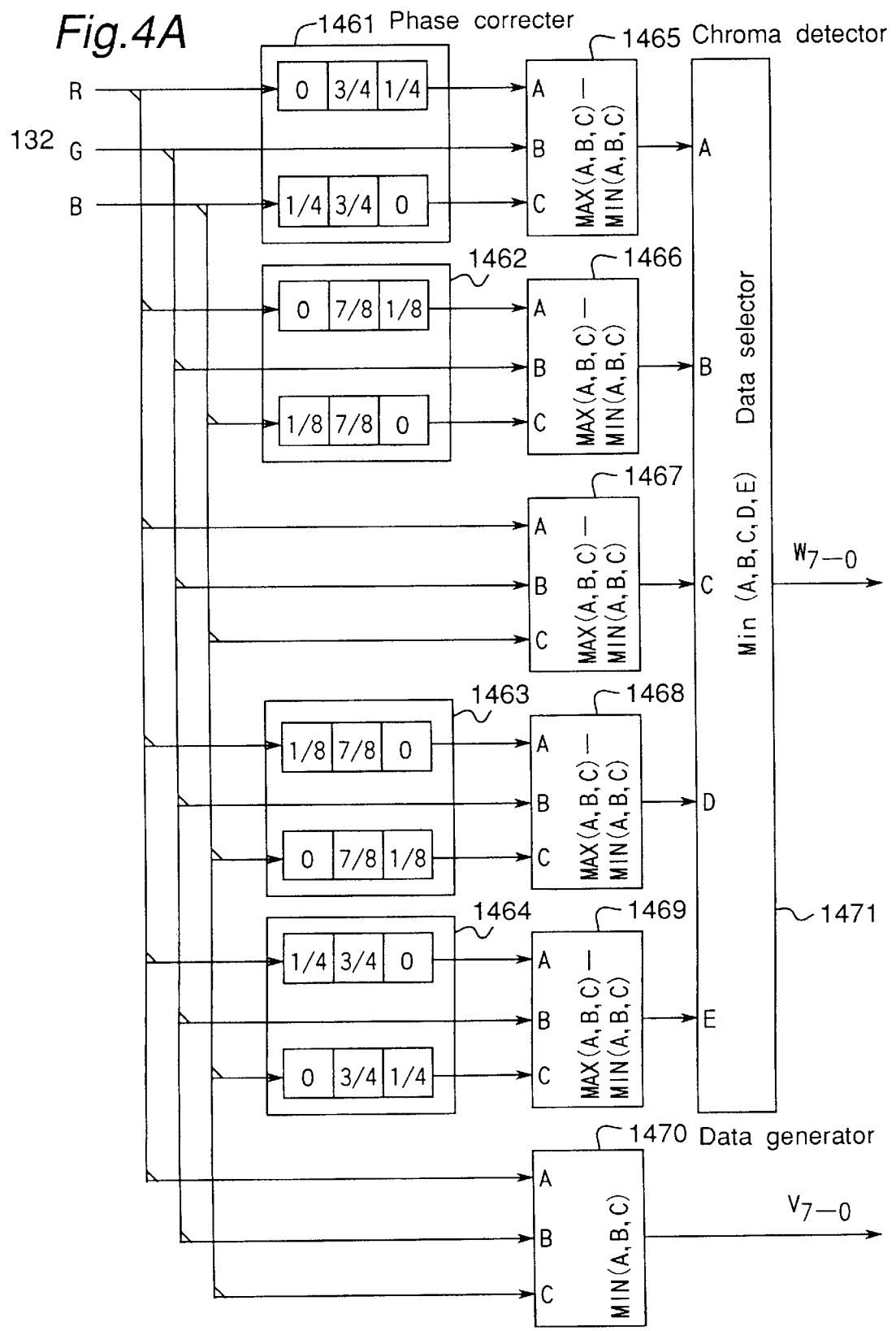

Fig.8

| 1/8 | 0   | 0 | 0    | −1/8 |
|-----|-----|---|------|------|
| 1/8 | 1/8 | 0 | −1/8 | −1/8 |
| 1/8 | 1/8 | 0 | −1/8 | −1/8 |
| 1/8 | 1/8 | 0 | −1/8 | −1/8 |
| 1/8 | 0   | 0 | 0    | −1/8 |

Fig.9

| −1/8 | −1/8 | −1/8 | −1/8 | −1/8 |
|------|------|------|------|------|
| 0    | −1/8 | −1/8 | −1/8 | 0    |
| 0    | 0    | 0    | 0    | 0    |
| 0    | 1/8  | 1/8  | 1/8  | 0    |
| 1/8  | 1/8  | 1/8  | 1/8  | 1/8  |

Fig.10

| 0 | 0 | 1/4 | 0 | 0 |
|---|---|---|---|---|
| 0 | 0 | 0 | 0 | 0 |
| 1/4 | 0 | −1 | 0 | 1/4 |
| 0 | 0 | 0 | 0 | 0 |
| 0 | 0 | 1/4 | 0 | 0 |

| 1/16 | 1/8 | 1/16 |
|------|-----|------|
| 1/8  | 1/4 | 1/8  |
| 1/16 | 1/8 | 1/16 |

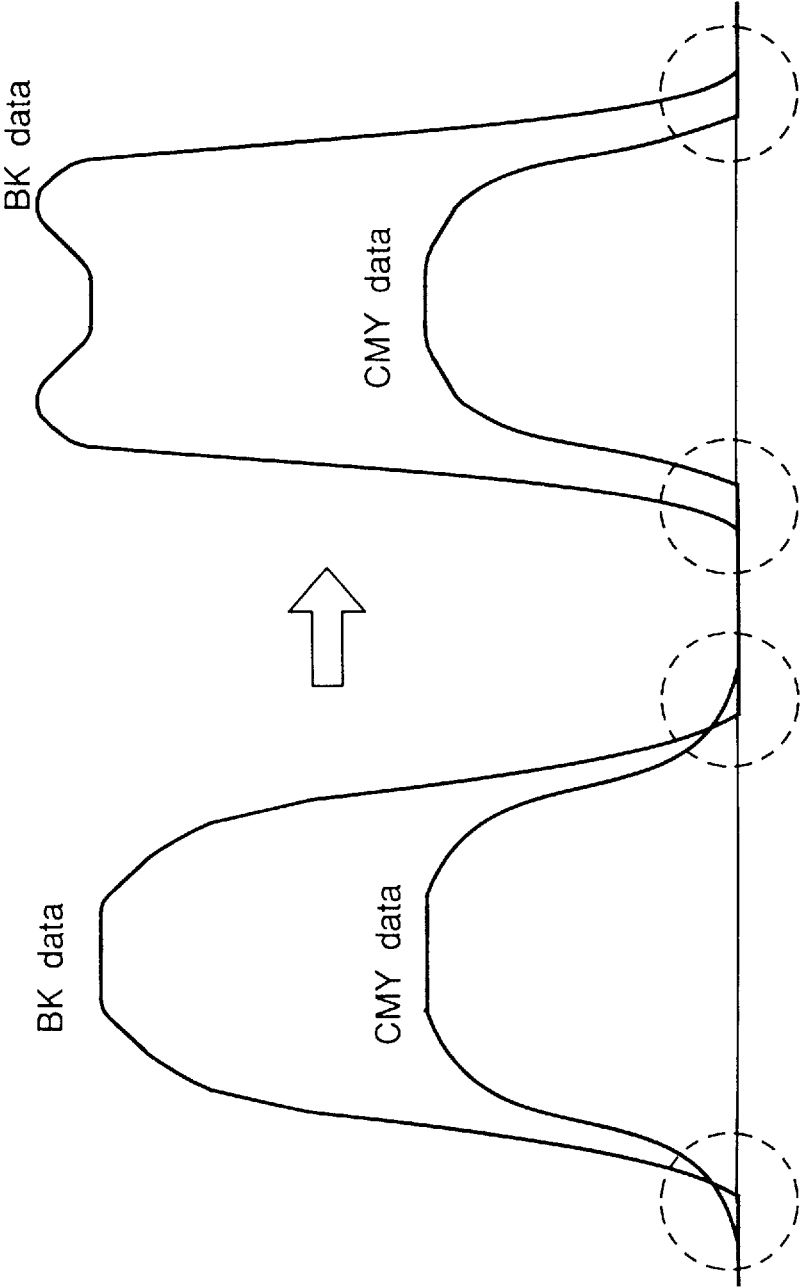

Fig.19

| 0 | 0 | −1/4 | 0 | 0 |
|---|---|---|---|---|
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

Fig.21

| 1/64 | 1/32 | 1/32 | 1/32 | 1/64 |
|------|------|------|------|------|
| 1/32 | 1/16 | 1/16 | 1/16 | 1/32 |
| 1/32 | 1/16 | 1/16 | 1/16 | 1/32 |
| 1/32 | 1/16 | 1/16 | 1/16 | 1/32 |
| 1/64 | 1/32 | 1/32 | 1/32 | 1/64 |

Fig.22

| 0 | 0    | 0   | 0    | 0 |
|---|------|-----|------|---|
| 0 | 1/16 | 3/8 | 1/16 | 0 |
| 0 | 1/8  | 1/4 | 1/8  | 0 |
| 0 | 1/16 | 1/8 | 1/16 | 0 |
| 0 | 0    | 0   | 0    | 0 |

Fig.23

| 0 | 0    | 0    | 0    | 0 |
|---|------|------|------|---|
| 0 | 1/64 | 3/32 | 1/64 | 0 |
| 0 | 3/32 | 9/16 | 3/32 | 0 |
| 0 | 1/64 | 3/32 | 1/64 | 0 |
| 0 | 0    | 0    | 0    | 0 |

Fig.24

| $a_{11}$ | $a_{12}$ | $a_{13}$ | $a_{14}$ | $a_{15}$ |
|---|---|---|---|---|
| $a_{21}$ | $a_{22}$ | $a_{23}$ | $a_{24}$ | $a_{25}$ |
| $a_{31}$ | $a_{32}$ | $a_{33}$ | $a_{34}$ | $a_{35}$ |
| $a_{41}$ | $a_{42}$ | $a_{43}$ | $a_{44}$ | $a_{45}$ |
| $a_{51}$ | $a_{52}$ | $a_{53}$ | $a_{54}$ | $a_{55}$ |

Fig.25

| $a_{11}$ | $a_{12}$ | $a_{13}$ |
|---|---|---|
| $a_{21}$ | $a_{22}$ | $a_{23}$ |
| $a_{31}$ | $a_{32}$ | $a_{33}$ |

IMAGE PROCESSOR

BACKGROUND OF THE INVENTION

1. Field of the Invention

The present invention relates to a digital color image processor.

2. Description of the Prior Art

In a digital color image processor, black characters in a document are usually discriminated to improve reproducibility of black characters. Characters (edges) are discriminated from achromatic image portions in a document by detecting an edge portion and an achromatic portion in the document. Various techniques are proposed for discriminating an achromatic image, and they discriminate an achromatic portion according to color data, that is, red (R), green (G) and blue (B) data received by the image processor. For example, in a technique, a difference of the maximum from the minimum of R, G and B color data, that is, MAX(R, G, B)—MIN(R, G, B), is used as chroma data. A portion having a larger difference is decided to be a color image, while a portion having a lower difference is decided to be an achromatic image. On the other hand, an image scanner usually uses a reduction color sensor unit (refer to FIG. 2) which has three linear sensors in correspondence to the three colors of R, G and B. The sensors are shorter than the width of an image to be read, and a lens is provided in an optical system in the image scanner to converge light onto the reduction color sensor.

In a spectral distribution of color data having red (R), green (G) and blue (B), red light has longer wavelength components, and blue light has shorter wavelength components, as shown in FIG. 10. Further, the lens in the reduction optical system has color aberration, and when a light is incident near two ends thereof in the main scan direction, the lens converges shorter wavelength components in the incident light at the inner side (or in the side of the center of the document) and longer wavelength components at the outer side. Then, a color shift happens when a color image is read. This color shift affects the above-mentioned discrimination of an achromatic portion. It is expected that the difference, MAX(R, G, B)—MIN(R, G, B), will become minimum at a black edge portion, but the edge may erroneously be recognized as a color edge due to the color shift.

SUMMARY OF THE INVENTION

An object of the present invention is to provide an image processor which reduces defects in an image of a document when the image is reduced.

An image processing apparatus according to the invention reads a color image with pixels aligned along a direction and provides first color data on the color image. The first color data obtained at each pixel including a plurality of data for different wavelengths from each other, such as red, green and blue data. A first operator calculates first chroma data according to the first color data. On the other hand, a phase shift device generates second color data by shifting a phase of a first data such as red data for a first wavelength in the first color data by a first shift amount such as ¼ pixel in the direction and by shifting a phase of a second data such as blue data for a second wavelength shorter than the first wavelength in the first color data by a second shift amount in the direction. Then, a second operator calculates second chroma data according to the second color data. A selector selects the first chroma data or the second chroma data according to predetermined conditions, and an image processor processes the color image according to the selected first or second chroma data. For example, the selector selects chroma data having a lower chroma, and the image processor discriminates a black edge of a character in the color image. Preferably, a plurality of the phase shift devices for different phase shifts and a plurality of the second operators are provided, and the selector selects one of the first chroma data and a plurality of the second chroma data.

An advantage of the invention is that a black character area in a color document can be discriminated correctly even at ends in the main scan direction.

Another advantage of the invention is that anomalies such as color bordering of a black character due to color aberration are be prevented.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 4A, 4B and 4C are block diagrams of a region discriminator;

FIG. 8 is a diagram of a primary differential filter along the main scan direction;

FIG. 9 is a diagram of a primary differential filter along the subscan direction;

FIG. 10 is a diagram of a secondary differential filter;

FIGS. 16A and 16B are diagrams for explaining a slight extension of chromatic data outside a character and deletion of such extension;

FIG. 19 is a diagram of a Laplacian filter;

FIG. 21 is a diagram of a smoothing filter for smoothing input data of 400 dpi to 300 dpi;

FIG. 22 is a diagram of a smoothing filter for smoothing input data of 400 dpi to 200 dpi;

FIG. 23 is a diagram of a smoothing filter for smoothing input data of 400 dpi to 100 dpi;

FIG. 24 is a diagram of a filter of 5*5 matrix for detecting a minimum; and

FIG. 25 is a diagram of a filter of 3*3 matrix for detecting a minimum.

DETAILED DESCRIPTION OF THE PREFERRED EMBODIMENTS

Figure 1:
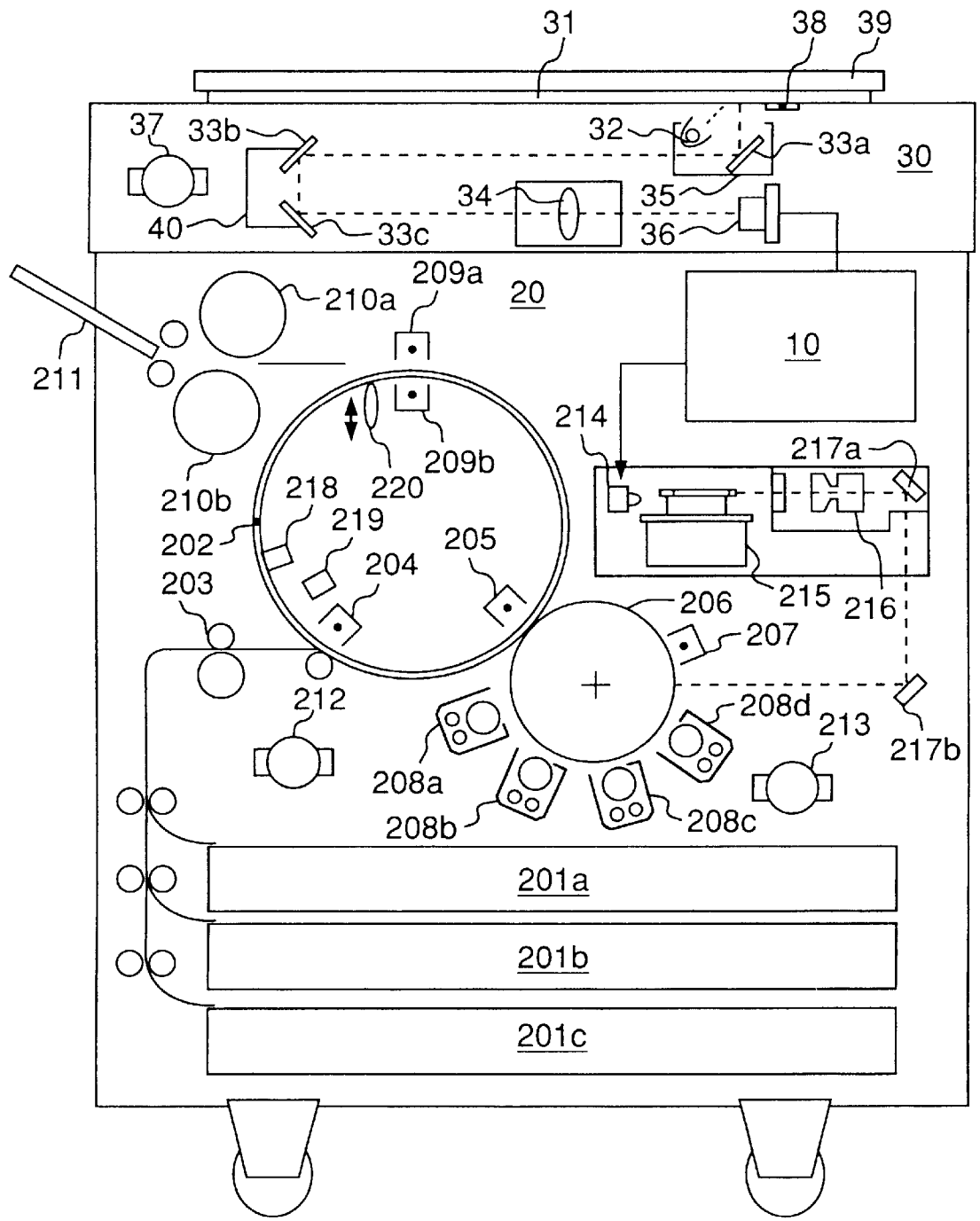
FIG. 1 is a schematic sectional view of a digital color copying machine of an embodiment of the invention.

Referring now to the drawings, wherein like reference characters designate like or corresponding parts throughout the drawings, an embodiment of the invention is described.
(A) Outline of digital color copying machine FIG. 1 shows a digital full color copying machine comprising an image scanner 30, a data processor unit 10 and a printer section 20. The image scanner 30 reads a document image, and the data processor unit 10 processes the data read received from the image scanner 30. The printer section 20 print a full color or black image on a paper according to the data received from the data processor unit 10. An outline of the digital copying machine is explained below.

In the image scanner 30, a document is put on a platen glass 31 and covered with a plate 39, or it is fed onto a platen 31 by an automatic document feeder (not shown) if mounted. A white plate 38 for shading correction is provided at an edge of the platen glass 31. The document is exposed with a lamp 32, and a light reflected from the document is guided through mirrors 33a, 33b and 33c and converged by a lens 34 onto a color sensor 36 to be converted to color data of red (R), green (C) and blue (B). Then, they are sent to the data processor 10. When the document image is read, a first slider 35 and a second slider 40 move at a speed of V and at a speed of V/2 mechanically by a motor 37 along the longitudinal direction (subscan direction) perpendicular to an electrical scan direction (main scan direction) of the color sensor 36 so that the entire document is scanned. The data processor 10 processes the image data electrically to output components of magenta (M), cyan (C), yellow (Y) and black (Bk) to the printer section 20.

In the printer section 20, the image signals of C, M, Y and Bk received from the data processor 10 are used to drive a laser diode 214, and a laser beam emitted by the laser diode 214 propagates through a polygon mirror 215, an f-θ lens 216, mirrors 217a and 217b to expose a rotating photoconductor drum 206 charged beforehand by a charger 207 so as to form an electrostatic latent image. One of four development units 208a, 208b, 208c and 208d of toners of cyan, magenta, yellow and black is selected to develop the latent image with toners. On the other hand, a sheet of paper supplied from a cassette 201a, 201b or 201c is carried by timing rollers 203 to be wound on a transfer drum 202 with an adsorption charger 204. It is carried further to a transfer portion, and the toner image on the photoconductor drum 206 is transferred by a transfer charger 205 onto the sheet of paper. The above-mentioned printing process are repeated for four colors of yellow, magenta, cyan and black. That is, toner images of the four colors are transferred successively onto the sheet of paper. Then, the paper is separated by separation chargers 209a, 209b and a claw 70 from the transfer drum 202, passes through fixing rollers 210a, 210b for fixing the toner image and is discharged onto a tray 211.

Figures 2A, 2B:
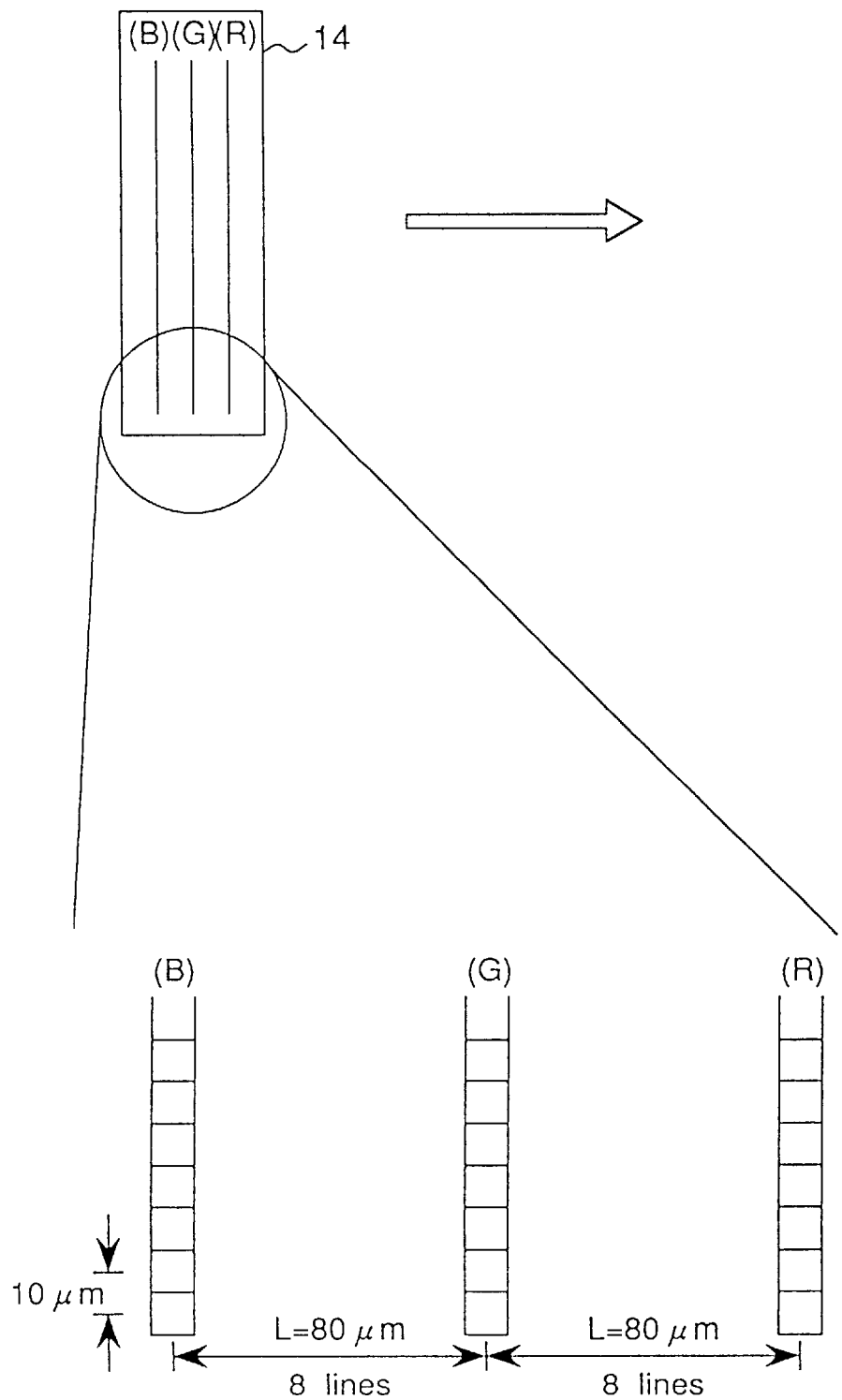
FIG. 2 is a plan view of an operational panel of the copying machine.
Figure 3A:
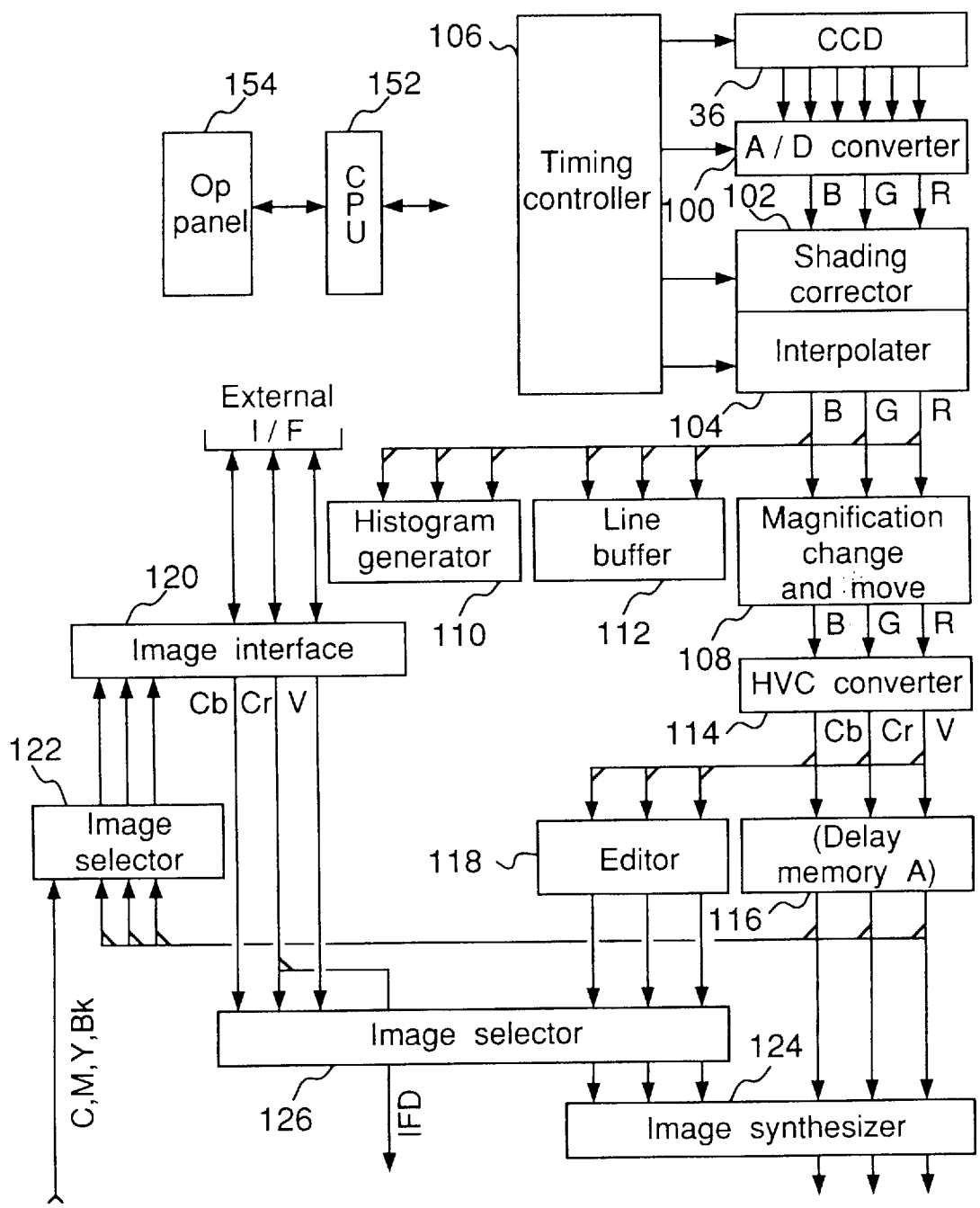
FIGS. 3A and 3B are block diagrams of a read signal processor.
Figure 3B:
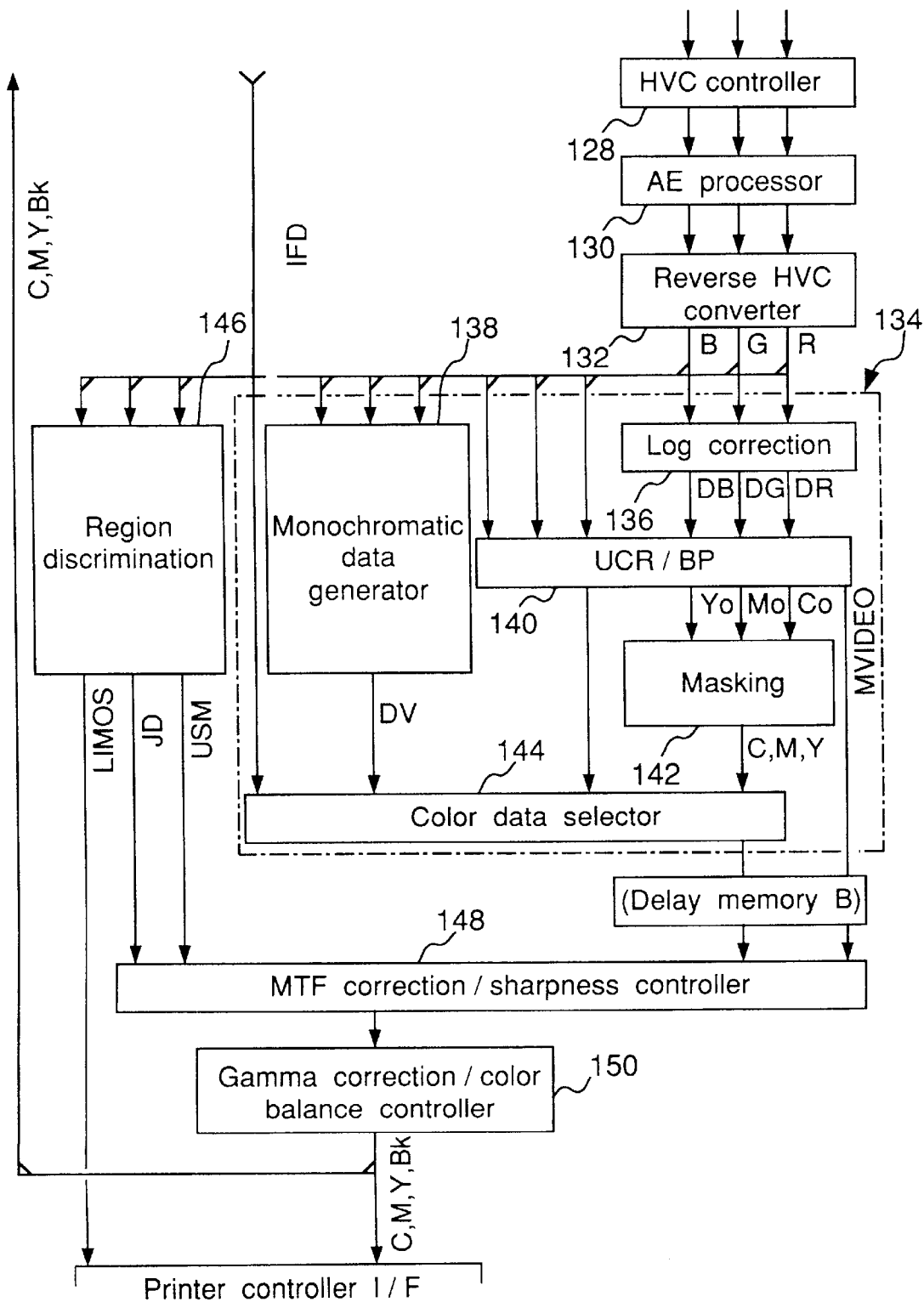

FIG. 2 shows the color sensor 36 which has three linear CCD sensors in correspondence to the three colors of R, G and B. The linear sensors extend perpendicularly to the subscan direction shown with an arrow. As shown in an enlarged view thereof shown in the lower part of FIG. 2, the three lines are separated from each other by eight lines.
(B) Outline of read data processor Next, image data processing in the data processor 10 is described. FIGS. 2A and 2B show image processing in the data processor 10. As explained above, the image scanner 30 converges light reflected from a document onto the color sensor 36 to generate analog data due to photoelectric conversion. The analog data are received by an analog-to-digital (A/D) conversion section 100 in the data processor 10.

In the A/D conversion section 100, the analog image signals are converted to 8-bit digital data (256 gradation levels) of each of red (R), green (G) and blue (B). In order to eliminate scattering of reading of a quantity of light among CCD elements in the color sensor 36 along the main scan direction for each linear sensor of red, green and blue, a shading corrector 102 has stored reference data read on the white plate 38 in a memory (not shown), and when a document image is read, the data in the memory is converted to an inverted value thereof, and it is multiplied with a data on the document for shading correction. Next, an interpolator 104 performs line correction by adjusting the output of the data after shading correction according to positions of chips of red, green, and blue in the color sensor 36. A timing controller 106 controls timings for the color sensor 36, the A/D converter 100, the shading corrector 102 and the interpolator 104. Then, the interpolator 104 sends the R, G and B data to a magnification change and move section 108, a histogram generator 110, and a line buffer 112.

The magnification change and move section 108 has two line memories, and magnification change and movement of data along the main scan direction are controlled by changing timings of write and read to and from the memories. In this section, image repeat, amplification, reduction, mirror image processing and the like can be performed.

The histogram generator 110 converts the R, G and B data obtained in a prescan after the interpolation to value data V to generate histograms thereon. By using the histograms of the value data, automatic color selection, background level and document mode such as standard or photograph mode are set automatically.

An HVC converter 114 converts the R, G and B data received from the magnification change and move section 108 to value data (V) and color difference data (Cr and Cb). An editor 118 performs edition such as color change on the data received from the HVC converter 114 according to an instruction from a device provided as an option.

On the other hand, an image interface 120 receives V, Cr and Cb data through an image selector 122 and sends the image data to an external equipment, or it received image data from the external equipment. In order to deal with various types of image data, the image interface 120 has a function to convert the V, Cr and Cb data to R, G and B data, X, Y and Z data, L*, a* and b* data or the like, and vice versa. Further, C, M, Y and Bk data to be sent to the printer section 20 may be sent to the external equipment, and vice versa.

An image synthesizer 124 selects the V, Cr and Cb data received from the editor 118 or from the image selector 126 through the image interface 120, and performs image synthesis of the image data with another data received from the HVC converter 114.

An HVC controller 128 corrects the V, Cr and Cb data received from the image synthesizer 124 according to an instruction given with an operational panel 154, in order to adjust image quality by a user in correspondence to three human senses of value (V), hue (H) and chroma (C).

An automatic exposure (AE) processor 130 determines background level of a document on value data according to the histogram obtained by the histogram generator 110.

A reverse HVC converter 132 converts the V, Cr and Cb data again to R, G and B data.

In a color correction section 134, a logarithm (Log) converter 136 converts the R, G and B data received from the reverse HVC converter 132 to density data DR, DG and DB, while a monochromatic data generator 138 generates value data V from the R, G and B data in a color copy mode and generates gradation data DV for a monochromatic copy in a black copy mode. An undercolor-remove/black-paint section 140 calculates a difference between a maximum and a minimum of the data R, G and B, MAX(R, G, B)—MIN(R, G, B), as document value data and a minimum among DR, DG and DB, MIN(DR, DG, DB), as a document undercolor data. The DR, DG and DB data are subtracted by the minimum to generate cyan, magenta and yellow data Co, Mo and Yo, while black data Bk is generated based on the minimum to be sent to a color data selector 144. A masking operation section 142 converts the data Co, Mo and Yo after undercolor remove to cyan (C), magenta (M) and yellow (Y) data for color reproduction in the printer section 20, and sends them to the color data selector 144. The color data selector 144 outputs the DV data when monochromatic mode is instructed by the operational panel 154 or determined in the automatic color selection. In the full color mode, the color data selector 144 outputs C, M and Y data after the masking correction for reproduction of cyan, magenta and yellow and Bk data after the black paint processing for reproduction of black according to reproduction step signal CODE.

On the other hand, a region discrimination section 146 (refer to FIGS. 4A–4C) discriminates regions of a black character image, a dot image and the like, and generates a result (JD data) and a correction signal (USM data) based on the minimum MIN(R, G, B) and a difference between the maximum and the minimum (MAX(R, G, B)—MIN(R, G, B)). Further, a LIMOS signal is sent to the printer section 20 to define a duty ratio of an output period to a pixel period. The output period means a period when a signal is output. The LIMOS signal is set to improve compatibility of reproduction of black characters and granularity of toner image.

An MTF correction/sharpness controller 148 performs a various processing such as edge emphasis or smoothing on the data according to results obtained by the image discrimination section 146 for correcting a copy image received through the color data selector 144 appropriately.

A gamma correction/color balance section 150 controls a gamma curve (gradation correction curve) and color balance of C, M, Y and Bk data automatically or according to density level instructed by the operational panel 154. Then, the C, M, Y and Bk data and the LIMOS signal are sent to the printer section 20.

A CPU 152 controls the data processor 10, and the operational panel 154 is used to give data and to display data.

(C) Region discrimination

Figure 4B:
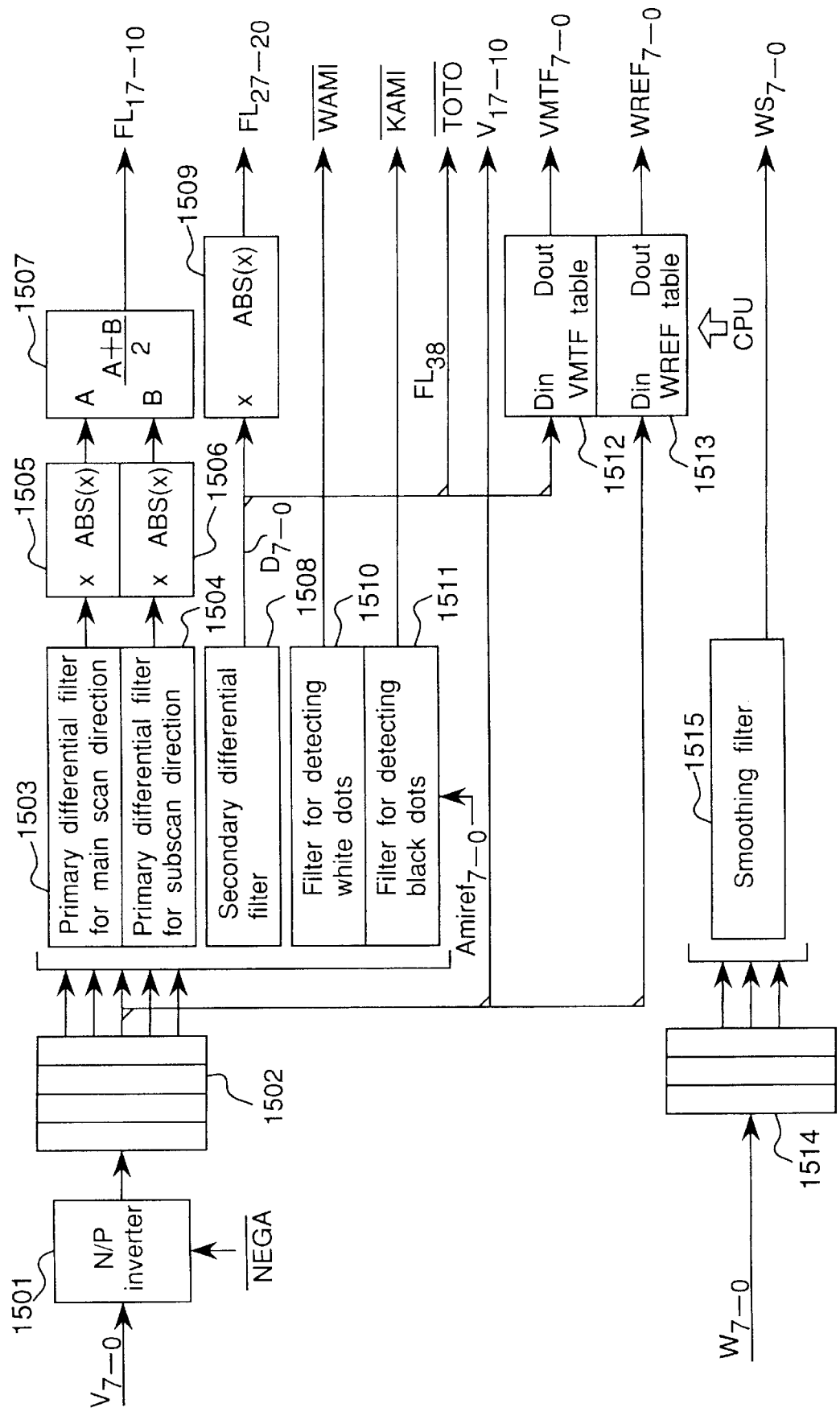
Figure 4C:
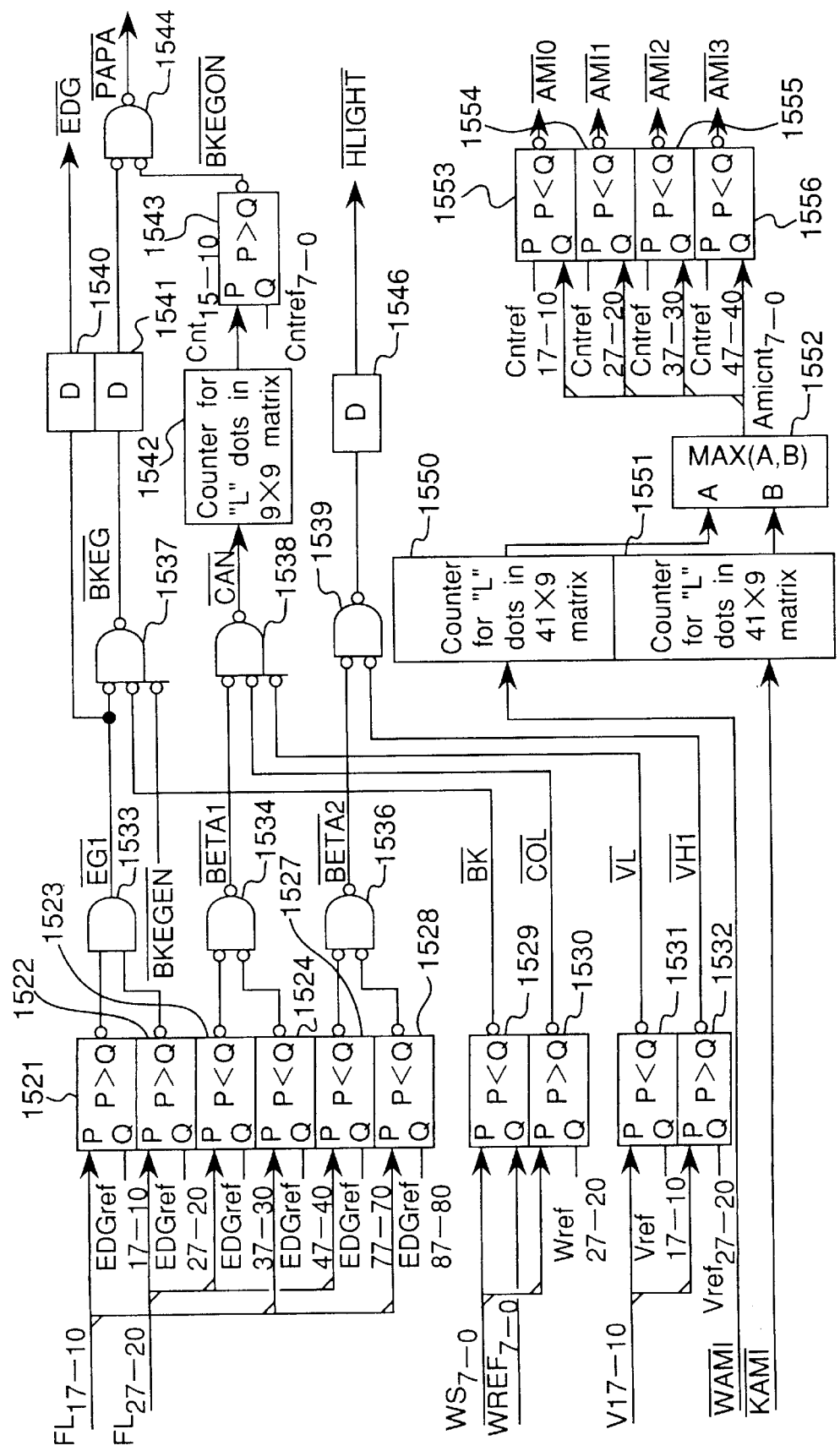

FIGS. 4A–4C show the region discriminator 146. In a part shown in FIG. 4A, pseudo-chroma data $W_{7-0}$ and pseudo-value data $V_{7-0}$ used for discrimination are generated from the R, G and B data received from the reverse HVC converter 132. The pseudo-chroma data $W_{7-0}$ is generated as a difference of the maximum from the minimum, or, MAX(R, G, B)—MIN(R, G, B) of the R, G and B data. That is, a color image having high chroma has a large W, while an achromatic or monochromatic image having low chroma has a small W.

Figure 5:
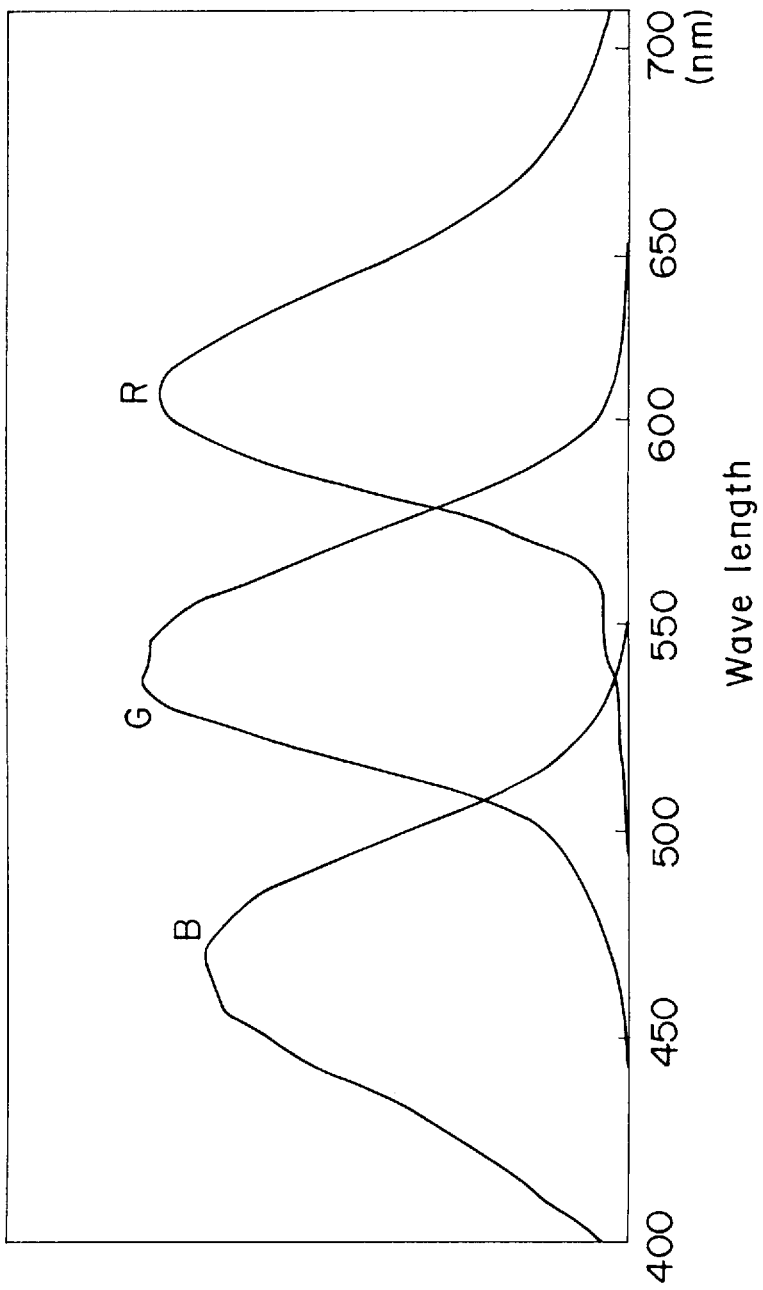
FIG. 5 is a graph on spectral distribution of R, G and B data.
Figure 6:
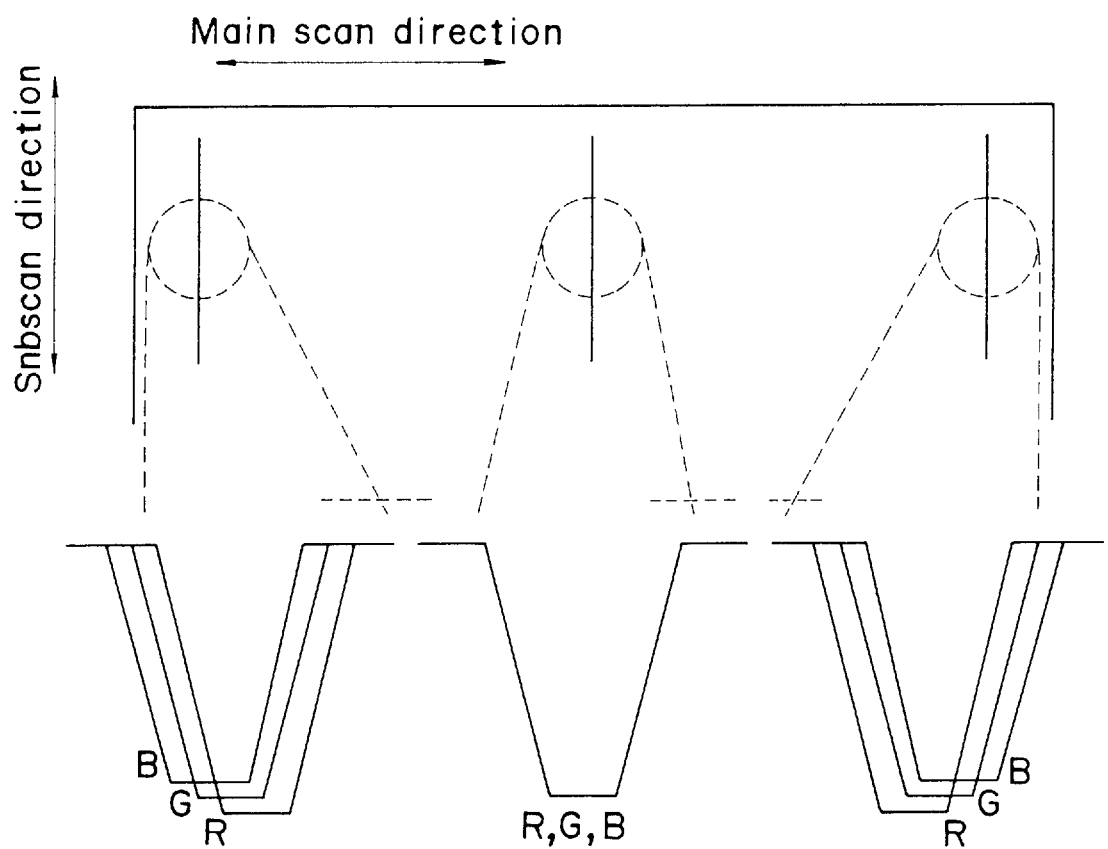
FIG. 6 is a diagram for explaining correction of phase shift due to color aberration.

In the part shown in FIG. 4A, before determining the chroma data, phase shift due to color aberration of the R, G and B data are corrected. FIG. 5 shows a spectral distribution of color data for red (R), green (G) and blue (B). Red light has longer wavelength components, and blue light has shorter wavelength components. As shown in FIG. 6, color aberration of an optical system arises at two ends along the main scan direction. When a vertical line existing at the center of the image is read, no color aberration occurs. However, when vertical lines existing near the two ends of the image are read, color aberration occurs at the ends of the lens 34. That is, as shown in FIG. 6, light R of longer wave-lengths is converged at an inner side, while light B of shorter wavelengths is converged at an outer side, in contrast to the image propagating through the central portion of the lens. Thus, phases of R, G and B of an image such as a vertical line are shifted on the color sensor 36. Color aberration causes color shifts at edges of a character image. Especially, an edge of a black character is liable to be discriminated erroneously. Then, for example, colors may extend around a character, or a character may be cut into parts.

In order to correct the phase shift, phase correctors 1461–1464 are provided as shown in FIG. 4A to correct four kinds of color aberration states. For example, the phase corrector 1461 outputs ¼*R(n+1)+¾*R(n) for an n-th red data R(n) and ¾*B(n)+¼*B(n−1) for an n-th blue data B(n). The other phase correctors 1462–1464 have different predetermined correction coefficients for replacing with R(n) and B(n). The correction of the R, G and B color data for color aberration is shown below. (1) For a shift of ¼ dot at the main scan direction reference side, $$R(n)=0.25*R(n+1)+0.75*R(n),$$

$$G(n)=G(n),$$

and $$B(n)=0.75*B(n)+0.25*B(n-1).$$

(2) For a shift of ⅛ dot at the main scan direction reference side, $$R(n)=0.125*R(n+1)+0.875*R(n),$$

$$G(n)=G(n),$$

and $$B(n)=0.875*B(n)+0.125*B(n-1).$$

(3) At the center in the main scan direction, $$R(n)=R(n)$$

$$G(n)=G(n),$$

and $$B(n)=B(n).$$

(4) For a shift of ⅛ dot at the opposite side to the reference side in the main scan direction, $$R(n)=0.875*R(n)+0.125*R(n-1),$$

$$G(n)=G(n),$$

and $$B(n)=0.125*B(n+1)+0.875*B(n).$$

(5) For a shift of ¼ dot at the opposite side to the reference side in the main scan direction, $$R(n)=0.75*R(n)+0.25*R(n-1),$$

$$G(n)=G(n),$$

and $$B(n)=0.25*B(n+1)+0.75*B(n).$$

In FIG. 4A, chroma detectors 1465–1469 calculates chroma data which is equal to a difference of the maximum from the minimum of R, G and B data of the phase correctors 1461–1464. Then, a data selector 1471 selects the minimum data among the differences to output it as the chroma data corrected for color aberration.

This correction is based on that there are no phase shifts of R, G and B lights when color aberration is corrected and that {MAX(R, G, B)—MIN(R, G, B)} will become minimum when there are no phase shifts of R, G and B. According to the color aberration characteristics, the direction of the phase shift of the R sensor is opposite to that of the B sensor, as shown in FIG. 6, and the amount of the phase shift is about the same for the R and B sensors. Then, at the reference side in the main scan direction, R data is shifted by +1/n dot, and B data is shifted by −1/n dot. On the other hand, at the opposite side to the reference side in the main scan direction, R data is shifted by −1/n dot, and B data is shifted by +1/n dot. Five chroma data for different n's are calculated, and the data nearest to the achromatic color is selected as the chroma data W.

On the other hand, a pseudo-light data generator 1470 generates the minimum data MIN(R, G, B) as the pseudo-light data $V_{7-0}$. Because the minimum data MIN(R, G, B) is used as the pseudo-light data $V_{7-0}$, the dependence on the colors of a document can be vanished as to the determination of a black character, an edge in a dot image or an isolated dot. The color in R, G and B data having the minimum data corresponds to a color component having the highest density among them. Therefore, the color has gradation level characteristic similar to colors such as yellow having a high value and to black or colors such as blue having a low value. Therefore, an edge or an isolated point can be detected without affected by the chroma and hue in contrast to the processing using the original value data.

Figure 7:
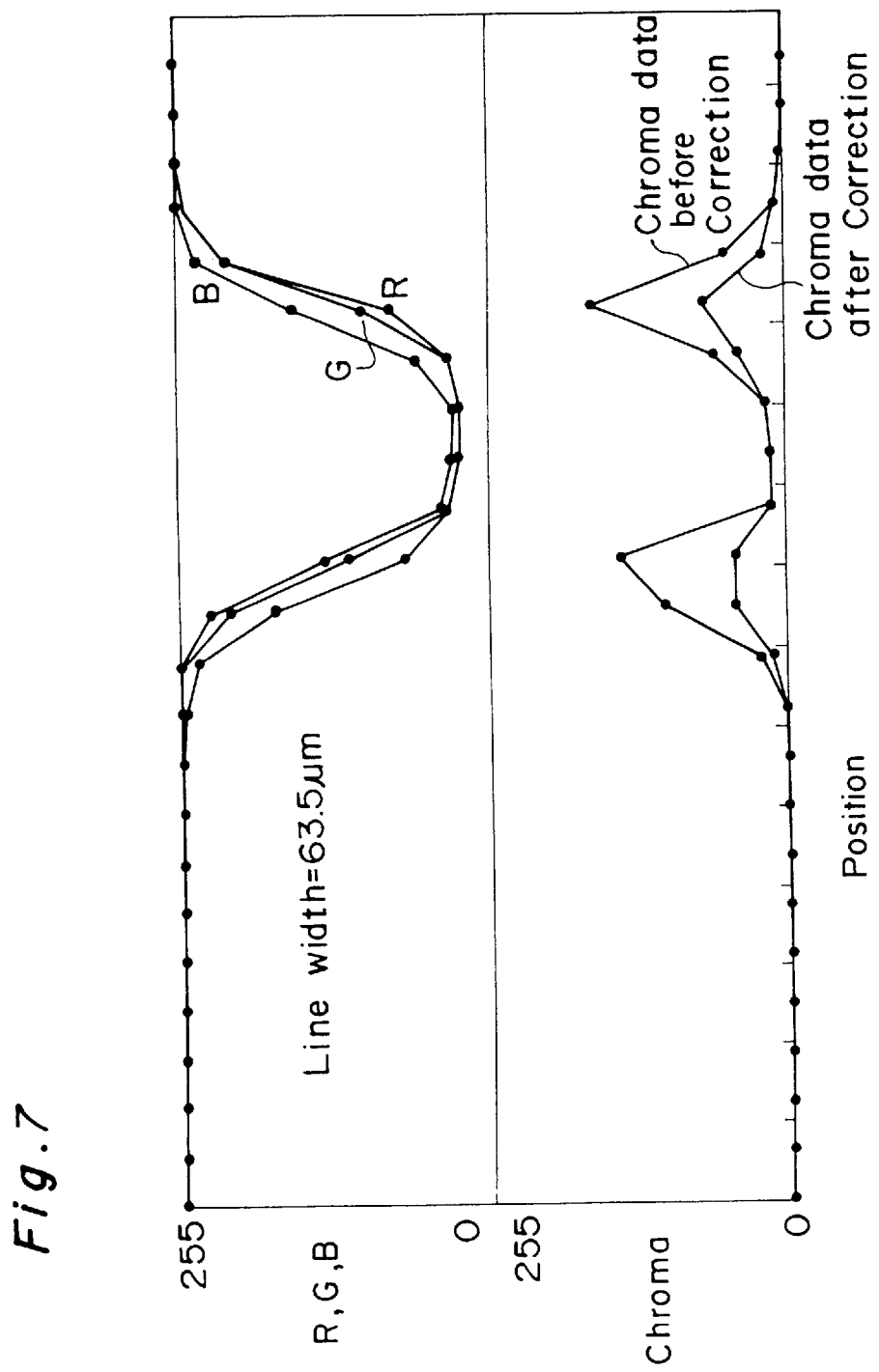
FIG. 7 is a graph of chroma data before and after correction of color aberration.

FIG. 7 shows chroma data before and after correction of color aberration. A line image is read and R, G, B data of a line image shown in the upper part in FIG. 7 are obtained. Chroma data is obtained from the R, G and B data, as shown in the lower part in FIG. 7. On the other hand, when the abberation correction using the circuit shown in FIG. 4A is used, the chroma data at the edges are reduced largely.

FIGS. 4B and 4C show the other parts of the region discriminator 146 which detects black character areas and dot image areas in a document image. The discrimination of black characters comprises five processings of (a) detection of a character (edge), (b) detection of a black pixel, (c) detection of a region which is liable to be detected as black, (d) detection of the inside and the outside of an edge portion, and (e) generation of black edge reproduction signal which is performed by the MTF corrector 148. These processings are explained below in detail.

First, detection of a character (edge) is explained. A character has two elements of edge parts and uniform color parts between two edge parts. The outside of an edge portion is referred to as "outside edge portion", and the inside between edge portions is referred to as "inside edge portion". A narrow character consists only of edge portions. Then, a character is detected by detecting edge portions.

In the region discriminator 146 shown in FIG. 4B, the value signal $V_{7-0}$ generated by the pseudo-value data generator 1470 is received through a negative/positive inverter 1501 to a line memory 1502. If $\overline{NEGA}$ signal set by an operator with the operational panel 154 is "L" level, the inverter 1501 inverts the input data.

Figure 10:
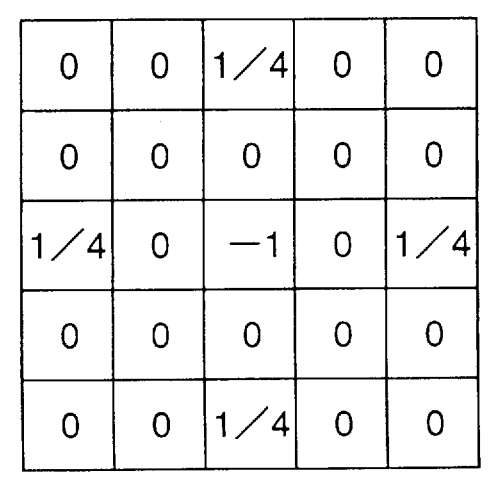

The data in the line memory 1502 is sent to primary differential filters 1503 and 1504 shown in FIGS. 8 and 9 for the main scan direction and for the subscan direction each having a 5*5 matrix and to a secondary differential filter 1508 shown in FIG. 10. The outputs of the primary differential filters 1503 and 1504 are sent to absolute value circuits 1505 and 1506 to calculate absolute values thereof because negative coefficients exists in the primary differential filters. An average circuit 1407 averages the two absolute values to output the average $FL_{17-10}$ to the comparators 1521, 1524, 1526 and 1528 shown in FIG. 4C. The average is obtained by taking into account the primary differentials in the main scan direction and in the subscan direction.

Figure 11:
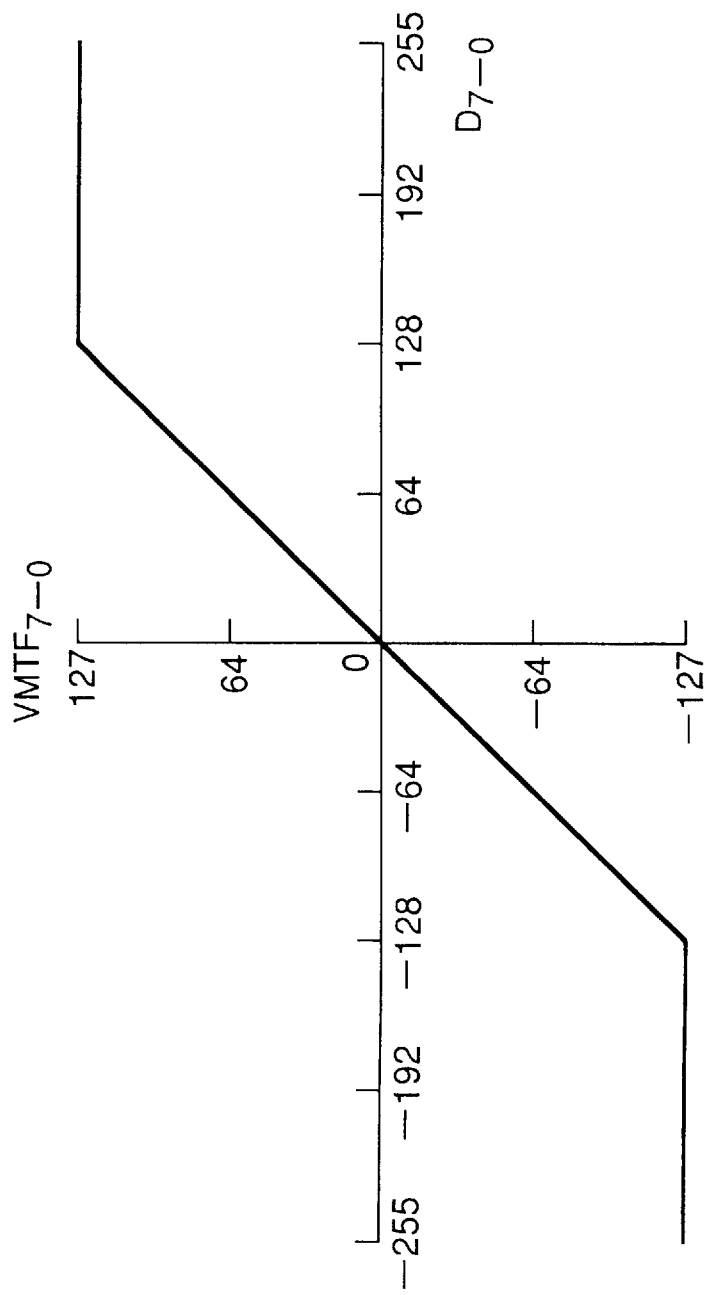
FIG. 11 is a graph of a VMTF table.

The secondary differential filter 1508 also receives data from the line memory 1502 and an obtained second differential $D_{7-0}$ is output to an absolute value circuit 1509 to output an absolute value $FL_{27-20}$ thereof. The absolute value is needed because the secondary differential filter 1408 also have negative coefficients. The absolute value $FL_{27-20}$ of the secondary differential is sent to comparators 1522, 1524, 1526 and 1528 for edge decision. The secondary differential $D_{7-0}$ is also sent to a VMTF table 1512 shown in FIG. 11. The VMTF table 1512 outputs value edge component $VMTF_{7-0}$ in correspondence to the secondary differential $D_{7-0}$.

The most significant bit $FL_{38}$ of the second differential data has a bit data on a sign, and "H" and "L" levels represent minus and plus signs. Therefore, if $FL_{38}$ is "L" lever, this means an outside of an edge detected, while if $FL_{38}$ is "H" lever, this means an inside of an edge detected. The most significant bit $FL_{38}$ is output as edge detection signal $\overline{TOTO}$ to the MTF correction/sharpness correction section 148. Then, the MTF correction/sharpness correction section 148 can detects an inside or an outside of an edge portion according to the signal $\overline{TOTO}$.

Next, edge detection is explained. The comparator 1521 for edge decision shown in FIG. 4C compares the first differential $FL_{17-10}$ with a first edge reference level $EDGREF_{17-10}$, and it outputs a signal of "L" level if the first differential $FL_{17-10}$ is larger than the first edge reference level $EDGREF_{17-10}$. On the other hand, the comparator 1522 for edge decision compares the second differential $FL_{27-20}$ with a second edge reference level $EDGREF_{27-20}$, and it outputs a signal of "L" level if the second differential $FL_{27-20}$ is larger than the second edge reference level $EDGREF_{27-20}$. An AND gate 1533 receives the results of the comparison by the comparators 1521, 1522 and it outputs an $\overline{EG}$ signal if a signal of "L" level is received from at least one of the comparators 1521 and 1522. The $\overline{EG}$ signal means an edge.

Figures 12, 13:
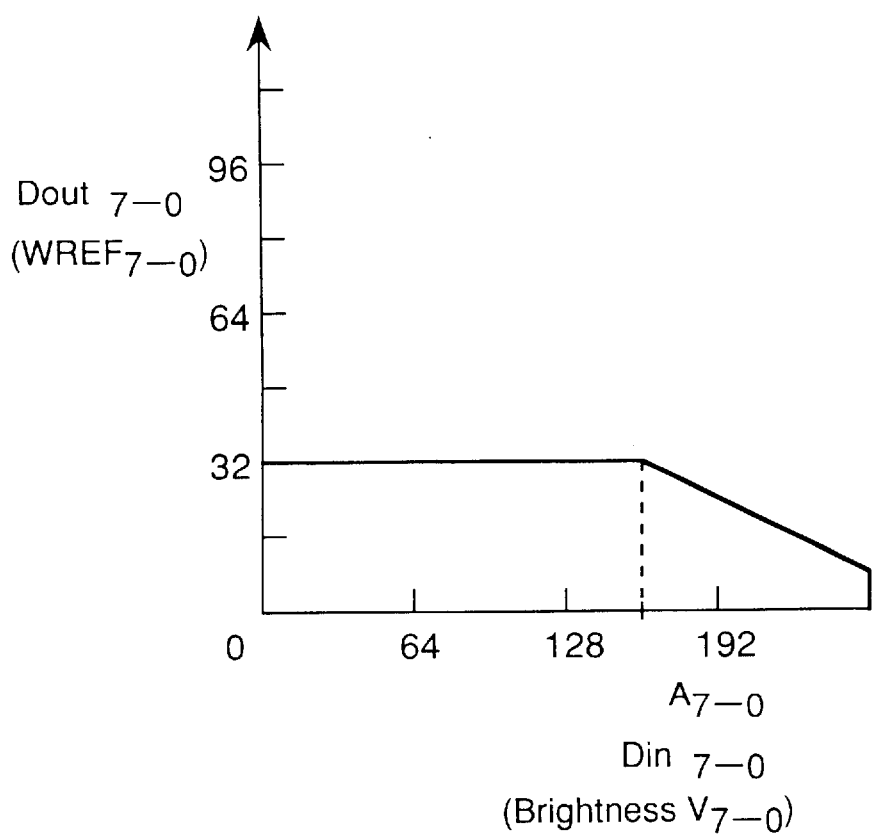
FIG. 12 is a diagram of a smoothing filter.
FIG. 13 is a graph of a WREF table.

Next, decision of black pixel is explained. Black is detected based on chroma $W_{7-0}$, or if the chroma $W_{7-0}$ is smaller than a reference value, the pixel is decided as black. The chroma data $W_{7-0}$ sent from the data selector 147 is received by the line memory 1514 and smoothed by a smoothing filter 1515 of 3*3 matrix shown in FIG. 12. The smoothing filter 1515 outputs chroma data $WS_{7-0}$ to comparators 1529 and 1530. The comparator 1529 compares $WS_{7-0}$ with a chroma reference data $WREF_{7-0}$. If the chroma data $WS_{7-0}$ is smaller than the chroma reference data $WREF_{7-0}$, the pixel is decided to be black, and the comparator 1529 sends $\overline{BK}$ signal to an AND gate 1537. The chroma reference data $WREF_{7-0}$ is determined by the WREF table 1513 according to the value data $V_{7-0}$. As shown in FIG. 13, the WREF table 1513 has a feature that if the value data $V_{7-0}$ is larger than a predetermined value, $WREF_{7-0}$ is decreased linearly with the value data $V_{7-0}$. This takes into account that black pixels determined erroneously will become evident. The AND gate 1537 outputs $\overline{BKEG}$ which means an edge of a black pixel (BK ="L") if the pixel is at an edge ($\overline{EG}$="L"), and $\overline{BKEGEN}$="L".

Figure 14A:
FIG. 14A is a diagram an image consisting of cyan and magenta.
Figure 14B:
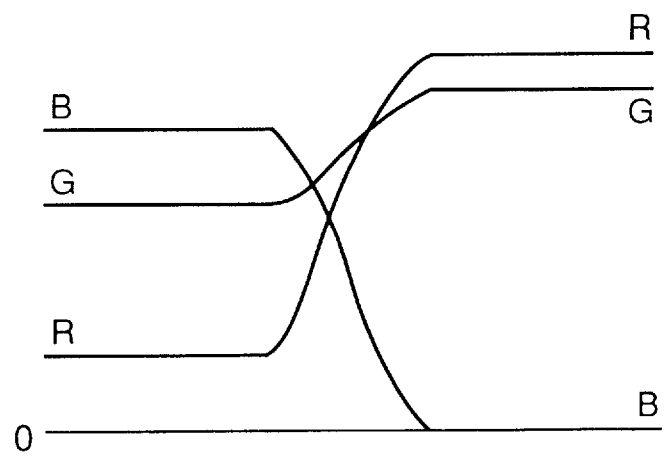
FIG. 14B is a graph of image data of red, green and blue of the image shown in FIG. 14A.
Figure 14C:
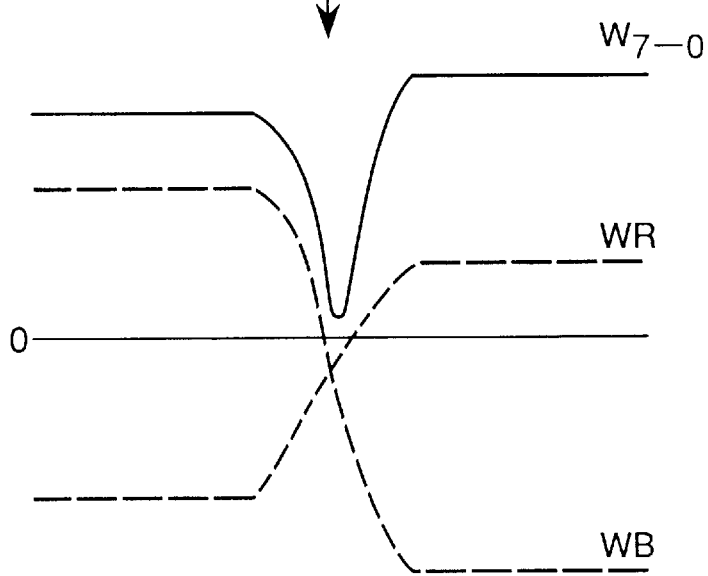
FIG. 14C is a graph of chroma and color difference data for explaining erroneous detection of black at a boundary between cyan and yellow.

Next, the detection of a region which is liable to be detected as black character is explained in detail. If only the detection of a character (edge) and the detection of black pixel explained above are performed, a character having a low value data $V_{7-0}$ and a low chroma data $WS_{7-0}$ such as dark blue and deep green is liable to be decided erroneously to be an edge of a black character. Further, if a color and its complementary color, such as cyan and yellow, as shown in FIG. 14A, are adjacent to each other, and image data of red, green and blue are read as shown in FIG. 14B, the chroma data $WS_{7-0}$ may become low at the boundary between them or change to black there, as shown in FIG. 14C. Such a point is also liable to be decided erroneously as an edge of a black character. For example, such an erroneous decision may happen when a blue character is printed on a background of yellow.

In order to prevent the erroneous decision, a uniform color part is detected. Then, even if the pixel is decided a black pixel, the decision is canceled if it is located in a region of uniform color part. Thus, a black character can be decided more precisely.

A uniform color part has features that it is not an edge, that it is a pixel in a color mode area and that a number of pixel having low value exceeds a certain number within a prescribed area. Then, the uniform color part is detected as follows: When the comparators 1423 and 1524 decide that the outputs $FL_{17-10}$ and $FL_{27-20}$ of the primary and secondary differential filters are lower than third and fourth edge reference levels $EDGref_{37-30}$ and $EDref_{47-40}$, an AND gate 1534 outputs signal $\overline{BETA1}$ which means a pixel not existing at an edge. Further, when a comparator 1530 decides that the chroma data $WS_{7-0}$ is smaller than a reference value $Wref_{27-20}$, it outputs a signal $\overline{COL}$ which means a color data. Further, if a comparator 1531 decides that the value data $V_{17-10}$ is smaller than a reference value $Vref_{17-10}$, it outputs a signal $\overline{VL_1}$. Then, the AND gate 1538 receives the signals $\overline{BETA1}$, $\overline{COL}$ and $\overline{VL_1}$ and outputs a signal $\overline{CAN}$ which means that the pixel is not at an edge, that the pixel is in a color mode area and that the pixel has a low value. Then, the pixel is taken as a uniform color part having a chromatic color not located in a background. A counter 1542 counts the number of the signals $\overline{CAN}$ in the unit of 9*9 pixels. If the number $Cnt_{17-10}$ of the signals $\overline{CAN}$ is smaller than a reference value $Cntref_{7-10}$, a comparator 1542 outputs a signal $\overline{BKEGON}$.

An AND gate 1544 outputs the above-mentioned signal $\overline{BKEG}$ delayed by a delay circuit 1541 and the above-mentioned signal $\overline{BKEGON}$. That is, even when the signal $\overline{BKEG}$ on the decision of a black edge is received, if the signal $\overline{BKEGON}$ is not received or if the pixel is located in a uniform color part, the decision of black edge is canceled, and the AND gate 1544 does not output a signal $\overline{PAPA}$. In other words, edge emphasis is performed only for a black character in an achromatic background. On the other hand, the number of pixels of a uniform color part is less than the prescribed reference value, the decision of black edge is kept to be valid to output the signal $\overline{PAPA}$ of "L" level.

The region discriminator 146 further decides some points explained below. A comparator 1532 is provided to decide a high light area by comparing the value data $V_{17-10}$ with a second reference level $Vref_{27-20}$. If the value data $V_{17-10}$ is larger than the second reference level $Vref_{27-20}$, it outputs a signal $\overline{VH1}$ which means that the pixel exists in a highlight area. The comparators 1527 and 1528 are provided to decide an area not located at an edge. They compare the first differential $FL_{17-10}$ and the second differential $FL_{27-20}$ with seventh and eighth reference levels $EDGref_{77-70}$ and $EDGref_{87-80}$. If the first differential $FL_{17-10}$ and the second differential $FL_{27-20}$ are smaller than seventh and eighth reference levels $EDGref_{77-70}$ and $EDGref_{87-80}$, a signal $\overline{BETA2}$ which means a pixel not located at an edge is sent by an AND gate 1536 to an AND gate 1539. The AND gate 1539 also receives the above-mentioned $\overline{VH1}$ signal from the comparator 1532, and it outputs a signal $\overline{HLIGHT}$, which means a highlight area, through a delay circuit 1546.

(D) MTF correction

Figure 15A:
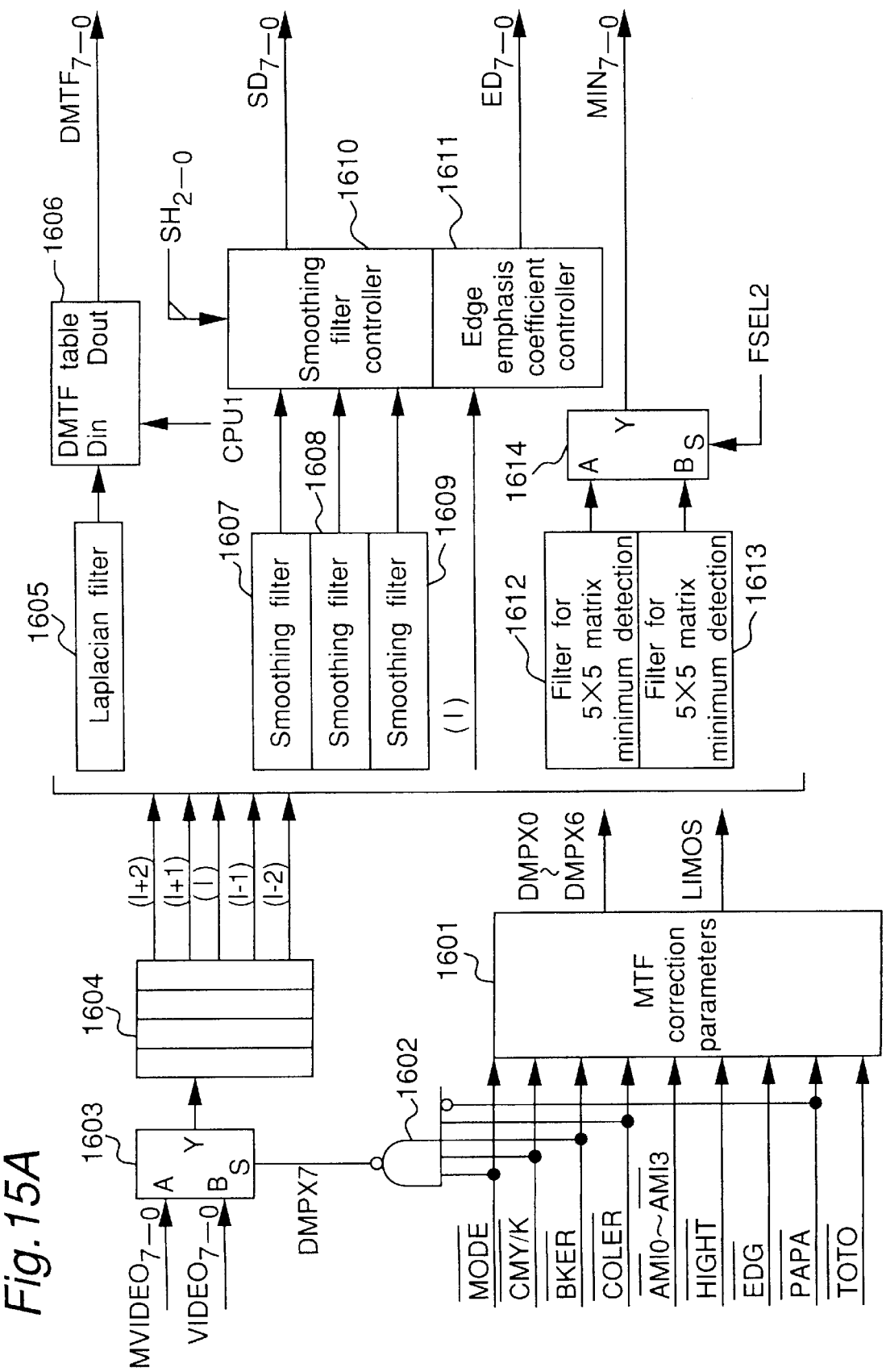
FIGS. 15A and 15B are block diagrams of an MTF correction section.
Figure 15B:
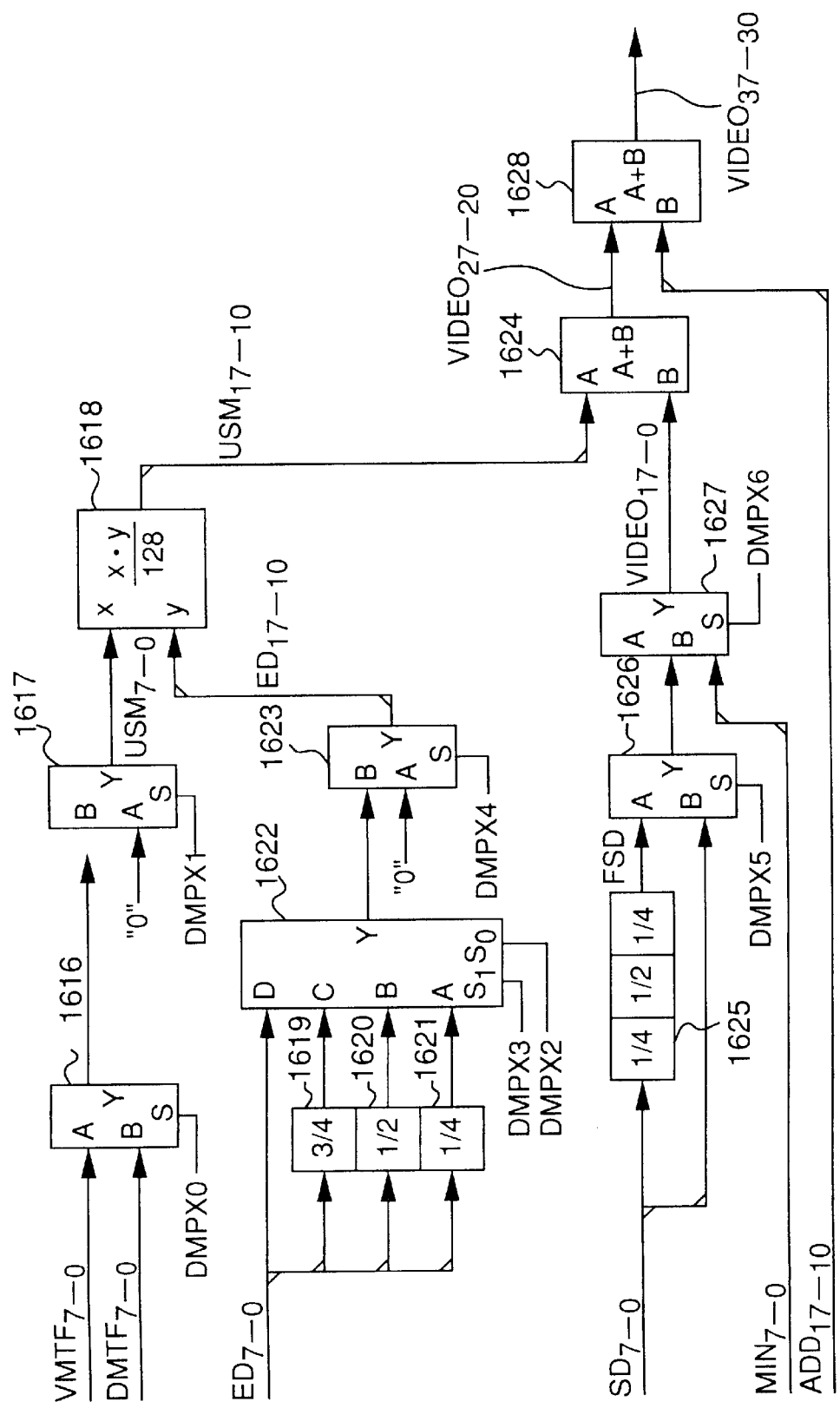

FIGS. 15A and 15B show the MTF correction/sharpness controller section 148 which performs edge emphasis and smoothing most suitable for the image data $VIDEO_{7-0}$ and $MVIDEO_{7-0}$ received from the color corrector 134 according to the kind of pixels recognized by the signals ($\overline{AMI0}$–$\overline{AMI3}$, $\overline{PAPA}$, $\overline{EDG}$ and $\overline{HLIGHT}$ and $\overline{TOTO}$) and printing situation recognized by status signals ($\overline{MODE}$, $\overline{CMY/K}$, $\overline{BKER}$, $\overline{COLER}$). Further, a duty ratio of laser emission is changed according to the kind of image recognized by the region discriminator 146. The duty ratio is explained later. Still further, a prescribed value is added to pixel data at leading and trailing edges to correct amounts of excess or deficient toners.

The MTF correction/sharpness controller section 148 recognizes the color of toners based on $\overline{CMY/K}$ signal. If the signal $\overline{CMY/K}$ is "L" level, printing with toners of cyan, magenta or yellow is performed, while if the signal is "H" level, printing with toners of black is performed. It also recognizes one of following modes by using the three signals $\overline{MODE}$, $\overline{BKER}$ and $\overline{COLER}$: Full color standard mode ($\overline{BKER}$="H", $\overline{COLER}$="H" and $\overline{MODE}$="H"), full color photographic mode ($\overline{BKER}$="H", $\overline{COLER}$="H" and $\overline{MODE}$="L"), monochromatic color standard mode ($\overline{BKER}$="H", $\overline{COLER}$="L" and $\overline{MODE}$="H"), monochromatic color photograph mode ($\overline{BKER}$="H", $\overline{COLER}$="L" and $\overline{MODE}$="L"), monochromatic standard mode ($\overline{BKER}$="L", $\overline{COLER}$="L" and $\overline{MODE}$="H"), and monochromatic photographic mode ($\overline{BKER}$="L", $\overline{COLER}$="L" and $\overline{MODE}$="L"). Further, it recognizes the kind of a pixel to be printed by using the result of region discrimination as follows: A highlight region of uniform density ($\overline{HLIGHT}$="L"), a non-edge region ($\overline{HLIGHT}$="H", $\overline{EDG}$="H", $\overline{PAPA}$="H"), a color edge region ($\overline{HLIGHT}$="H", $\overline{EDG}$="L", $\overline{PAPA}$="H"), and a black edge region ($\overline{HLIGHT}$="H", $\overline{EDG}$="L", $\overline{PAPA}$="L"). Further, a black edge portion is recognized by edge signal $\overline{TOTO}$. An outside edge portion is represented as $\overline{TOTO}$="L", and an inside edge portion is represented as $\overline{TOTO}$="H".

Before explaining the MTF corrector 148, MTF correction in the full color standard mode ($\overline{MODE}$="H", $\overline{BKER}$= "H" and $\overline{COLER}$="H") is explained. Table 1 compiles signal levels of various data received by a controller 1601, printing situations represented by the levels and signals of DMPX0, DMPX1, DMPX5 and DMPX6.

TABLE 1

Full color standard mode

| $\overline{CMY/K}$ | HLIGHT | $\overline{EDG}$ | $\overline{PAPA}$ | | DMPX1 | DMPX0 | USM | DMPX6 | DMPX5 | VIDEO |
|---|---|---|---|---|---|---|---|---|---|---|
| L | L | — | — | highlight | L | H | 0 | H | L | FSD |
| (CMY | H | H | H | non-edge | L | H | 0 | H | H | SD |
| mode) | H | L | H | color edge | H | H | DMTF | H | H | SD |
| | H | L | L | black edge | L | L | 0 | L | H | MIN |
| H | L | — | — | highlight | L | H | 0 | H | L | FSD |
| (BK | H | H | H | non-edge | L | H | 0 | H | H | SD |
| mode) | H | L | H | color edge | L | H | 0 | H | H | SD |
| | H | L | L | black edge (outside) | L | L | 0 | L | H | MIN |
| | H | L | L | black edge (inside) | H | L | VMTF | H | H | SD |

MTF correction of a pixel at a black edge ($\overline{HLIGHT}$ ="H", $\overline{EDG}$="L", $\overline{PAPA}$="L") is explained. When black toners are used for printing ($\overline{CMY/K}$="H"), VIDEO$_{27\text{-}20}$ is obtained by adding edge component VMTF$_{7\text{-}0}$ of value to ordinary image data SD$_{7\text{-}0}$ for edge emphasis. The edge component VMTF$_{7\text{-}0}$ of value is used instead of an edge component DMTF$_{7\text{-}0}$ of density because the former is more sensitive than the latter on an edge due to background. If the pixel composes a dot image, the edge emphasis (or value edge component VMTF$_{7\text{-}0}$) is limited according to the degree or density of dots. Thus, a Moire pattern is prevented which occur when an edge in a dot pattern is emphasized.

When cyan, magenta or yellow toners are used for printing ($\overline{CMY/K}$="L"), edge emphasis is not performed at pixels of inside and outside edge portions of a black edge, and a minimum data MIN$_{7\text{-}0}$ obtained in a 5*5 or 3*3 matrix is output as VIDEO$_{27\text{-}20}$. By using the minimum data, a very narrow extended line at an edge as shown in FIG. 16A in an area represented with a dashed circle can be removed as shown in FIG. 16B. On the other hand, when pixels at outside edge portions of black edge are printed with black toners, image data are processed similarly.

Figure 17A:
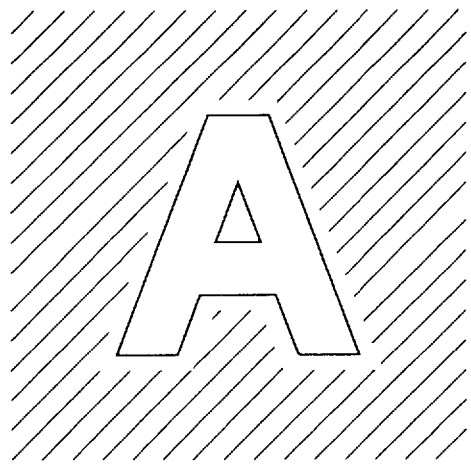
FIGS. 17A and 17B are diagrams of examples of images in correspondence to FIGS. 16A and 16B.
Figure 17B:
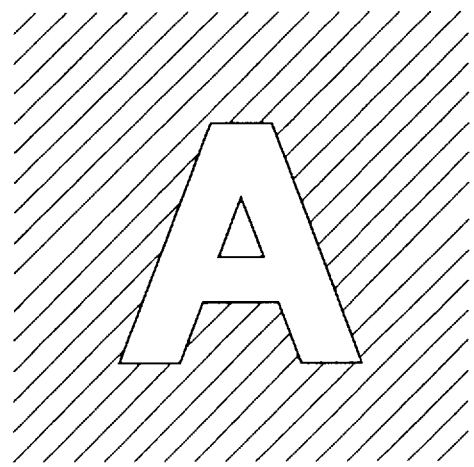

Next, it is explained why the minimum data MIN$_{7\text{-}0}$ are used to remove very narrow extension at an edge. If image data of cyan, magenta or yellow is subtracted by, for example, an edge detection quantity (such as FL$_{17\text{-}10}$ or FL$_{27\text{-}20}$ in this embodiment), white peripheral lines as shown in FIG. 17A are observed around a black edge. By using the minimum data MIN$_{7\text{-}0}$, the values of image data of cyan, magenta and yellow at the outside and the inside of an edge of a black character and those of image data of black at the outside of the black character are decreased. Then, as shown in FIG. 17B, a black character can be printed with edge emphasis without white peripheral defects shown in FIG. 17A. Further, because image data of black at the outside of the black character becomes smaller, edge emphasis does not increase the width of the character or does not roughen the contour of the character.

As explained above, the region discriminator 146 discriminates an edge in a color character and an edge in a black character. For a pixel in a color edge region ($\overline{HLIGHT}$ ="H", $\overline{EDG}$="L", $\overline{PAPA}$="HH") in the full color standard mode, edge emphasis is not performed when black toners are used in printing, and ordinary pixel data SD$_{7\text{-}0}$ is output as VIDEO$_{27\text{-}20}$. On the other hand, when cyan, magenta or yellow toners are used for printing, density edge component DTMF$_{7\text{-}0}$ is added to the ordinary pixel data SD$_{7\text{-}0}$ as VIDEO$_{27\text{-}20}$. The MTF correction section 148 does not perform edge emphasis when black is printed for an edge in a color character. Then, black border around a character due to edge emphasis can be prevented.

For a pixel in a highlight region of uniform density ($\overline{HLIGHT}$="L"), edge emphasis is not performed, and FSD$_{7\text{-}0}$ subjected to smoothing is used as image data VIDEO$_{27\text{-}20}$. Then, noises in the highlight region becomes not noticeable.

For a pixel in a non-edge region ($\overline{HLIGHT}$="H", $\overline{EDG}$ ="H", $\overline{PAPA}$="H") or in a uniform density portion, edge emphasis is not performed and ordinary image data SD$_{7\text{-}0}$ is used as image data VIDEO$_{27\text{-}20}$.

Next, MTF (mutual transfer) correction performed by the MTF corrector 148 shown in FIGS. 15A and 15B is explained. A controller 1601 for MTF correction parameters receives 1-bit control signals $\overline{AMI0}$–$\overline{AMI3}$, $\overline{HLIGHT}$, $\overline{EDG}$, $\overline{PAPA}$ and $\overline{TOTO}$ from the region discriminator 146. Further, the controller 1601 receives 1-bit control signals $\overline{MODE}$, $\overline{CMY/K}$, $\overline{BKER}$ and $\overline{COLER}$. The signal $\overline{MODE}$ represents a kind of a document, and it is set to be "L" level in the photography modes and "H" level in the standard modes. The signal $\overline{CMY/K}$ is a status signal representing a printing situation, and it is set to be "L" level for printing with cyan, magenta or yellow toners and "H" level for printing with black toners. The signal $\overline{BKER}$ requires signal processing in the monochromatic modes. The signal $\overline{COLER}$ requires signal processing in the monochromatic color modes. The signals $\overline{EKER}$ and $\overline{COLER}$ are area signals. The controller 1601 supplies DMPX0–DMPX6 shown in Table 1 and signal LIMOS shown in Table 2.

TABLE 2

Setting of duty ratio

| PAPA | MODE | TOTO | LIMOS |
|---|---|---|---|
| L | H | H | L |
| L | | L | H |
| H | | — | H |
| H | L | — | H |

Figure 18:
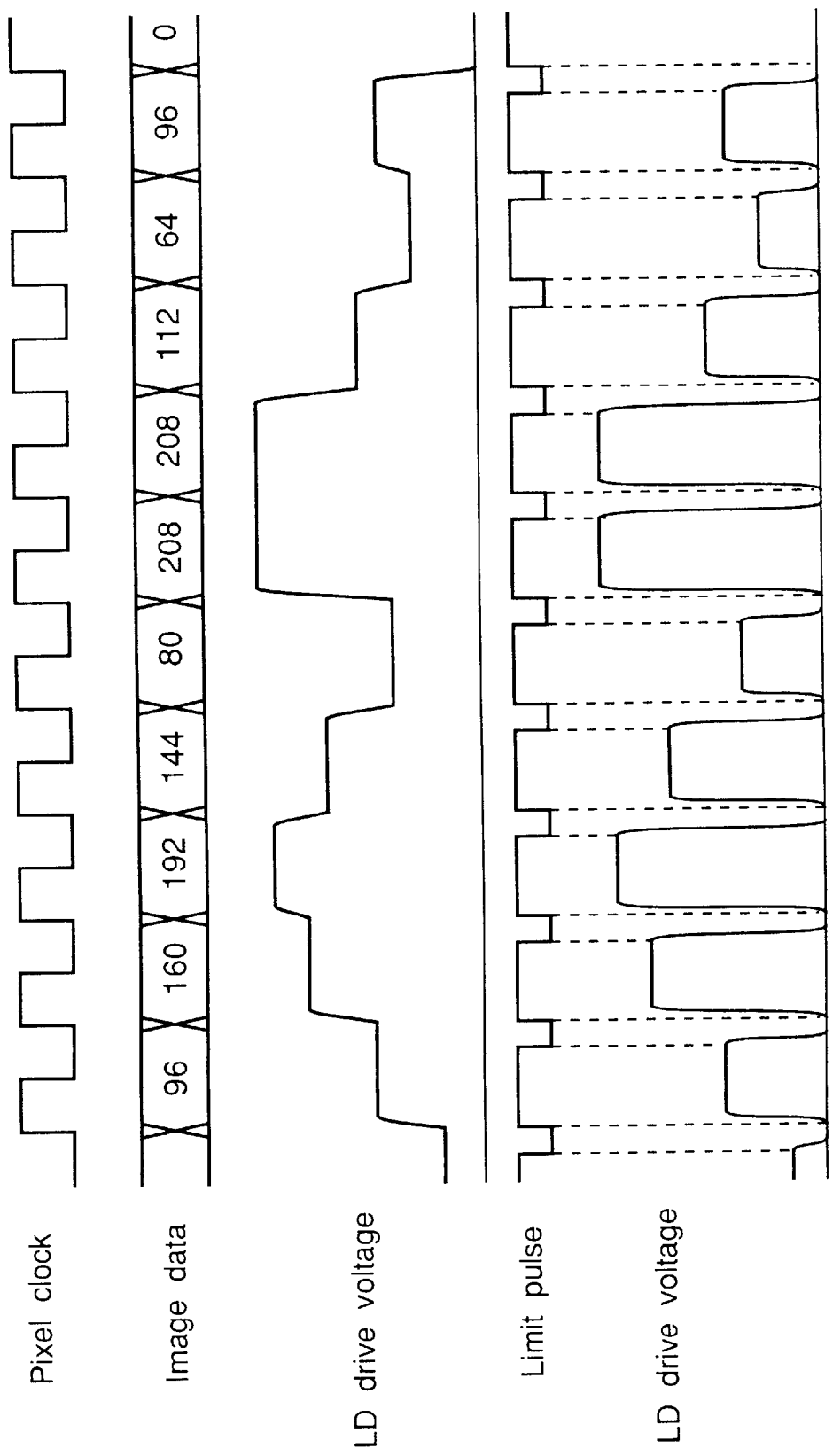
FIG. 18 is a timing chart of pixel clock, image data, driving voltage for laser diode, limit pulse, and driving voltage with a duty ratio.

The signal LIMOS changes a duty ratio of the laser diode emitting according to the image data. A period when the laser diode does not emit may be provided in one pixel clock cycle. In such a case, the duty ratio is defined as a ratio of the laser emission period in one pixel clock cycle. FIG. 18 shows a timing chart on driving the laser diode wherein two types of driving signal for the laser diode (LD) having duty ratios of 100 % and 80 % are shown. If the signal LIMOS= "L", the duty ratio is set to be 100 W. If the signal LIMOS ="H", the duty ratio is set to be 80 %. For the standard mode ($\overline{\text{MODE}}$=H), the signal LIMOS is set to be "L" for a pixel in an inside edge portion ($\overline{\text{PAPA}}$="L" and $\overline{\text{TOTO}}$="H") to improve reproduction of edge portions. On the other hand, in the photography modes ($\overline{\text{MODE}}$="L") and in the standard mode (MODE="H") at an outer edge portion ($\overline{\text{PAPA}}$="L" and $\overline{\text{TOTO}}$="L") and at a non-edge region ($\overline{\text{PAPA}}$="H"), the signal LIMOS ="H" to provide non-emitting periods in order to make noises between lines unnoticeable.

The signals $\overline{\text{MODE}}$, $\overline{\text{CMY/K}}$, $\overline{\text{BKER}}$ and $\overline{\text{COLER}}$ and an inverted signal of the signal $\overline{\text{PAPA}}$ are also sent to a NAND gate 1602. Then, the NAND gate 1602 outputs a signal DMPX7 to S terminal of a selector 1603. The signal DMPX is "L" level when the signals $\overline{\text{MODE}}$, $\overline{\text{CMY/K}}$, $\overline{\text{BKER}}$ and $\overline{\text{COLER}}$ are "H" level and the signal $\overline{\text{PAPA}}$ is "L" level, or when black is printed at a black edge in the full color standard copy mode. The selector 1603 selects the value data MVIDEO$_{7-0}$ subjected to the masking processing when the signal DMPX7 is "L" level and selects the density data VIDEO$_{7-0}$ when the signal DMPX7 is "H" level.

The selector 1603 receives image data MVIDEO$_{7-0}$ subjected to masking processing at A input and image data VIDEO$_{7-0}$ converted to density at B input in the order or cyan, magenta, yellow and black. The data selected by the selector 1603 is supplied, through a line memory 1604 storing data of 5*5 matrix to a Laplacian filter, to a Laplacian filter 1605, smoothing filters 1607, 1608 and 1609, a filter 1612 for detecting a minimum in a 5*5 matrix and a filter 1613 for detecting a minimum in a 3*3 matrix.

Figure 19:
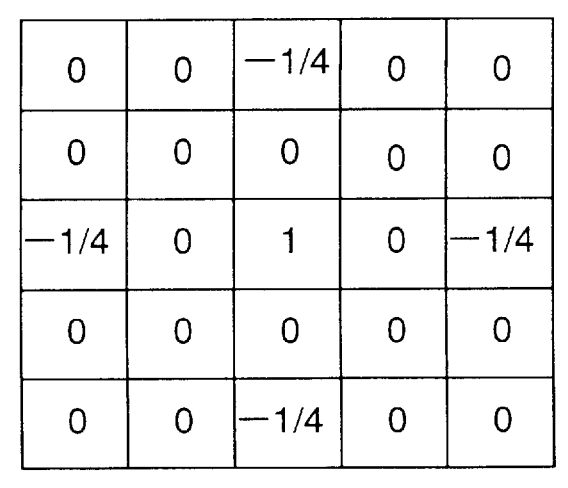
Figure 20:
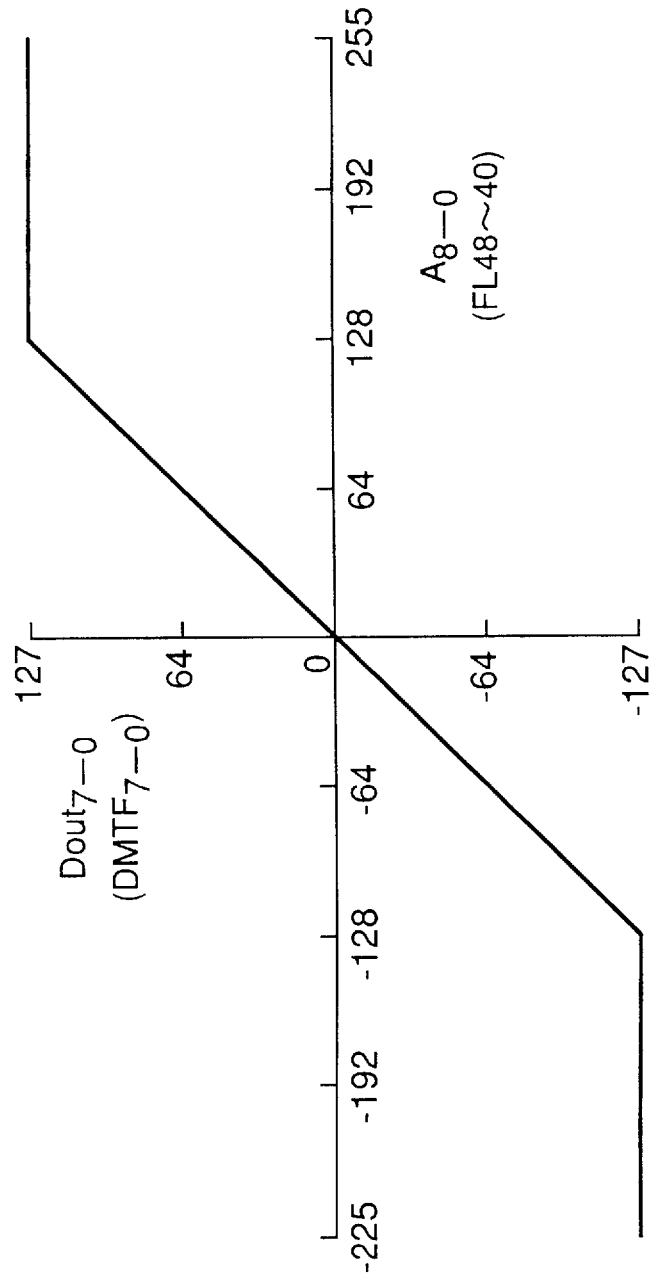
FIG. 20 is a graph of DMTF table.

The Laplacian filter 1605, shown in FIG. 19, converts a data on a pixel under interest at the center to an enhanced data, and sends it to a DMTF table 1606. The DMTF table performs conversion shown in FIG. 20 and sends a conversion data as density edge emphasis component data DMTF$_{7-0}$.

The smoothing filters 1607, 1608 and 1609 perform smoothing on the input data to 300, 200 and 100 dpi, and FIGS. 21, 22 and 23 show examples of the three filters. The data subjected to smoothing as well as the data without subjected to smoothing is sent to a controller 1610 for smoothing filters.

The controller 1610 also receives the sharpness change signal SH$_{2-0}$ from the HVC converter 1100. The controller 1610 selects one of the input data according to the change signal SH$_{2-0}$ and sends it as SD$_{7-0}$.

FIGS. 24 and 25 show filters 1612 and 1613 for detecting a minimum in a 5*5 matrix and in a 3*3 matrix. The filter 1612 detect a minimum MIN($a_{11}$, $a_{12}$, . . . , $A_{55}$) in a 5*5 matrix if a pixel under interest is placed at the center $a_{33}$ of the matrix and sends the result MINA$_{7-0}$ to a selector 1614. The filter 1613 detects a minimum MIN($a_{11}$, $a_{12}$, . . . , $A_{33}$) in a 3*3 matrix if a pixel under interest is placed at the center $a_{22}$ of the matrix and sends the result MINB$_{7-0}$ to the selector 1614. The selector 1614 selects one of them according to a selection signal FSEL and sends it as MIN$_{7-0}$. The selection signal FSEL has been determined experimentally. If the minimum data MIN$_{7-0}$ is used as the data of the pixel under interest, a narrow character is removed. On the other hand, MIN$_{7-0}$ is also used to remove undesired white peripheral lines as shown in FIG. 16A, as explained above.

Next, the MTF correction performed by the MTF corrector shown in FIG. 15B is explained. As explained above, selectors 1616 and 1617 select one of value edge component VMTF$_{7-0}$, density edge component DMTF$_{7-0}$ and edge emphasis quantity of zero according to the signals DMPX0 and DMPX1 on the kind of pixel DMPX0 and DMPX1. The signals DMPX0 and DMPX1 are defined in Table 1.

On the other hand, a selector 1622 receives ED$_{7-0}$ directly and through multipliers 1619–1621 which multiply it with ¾, ½ and ¼, and selects one of the four inputs according to parameters DMPX3 and DMPX2. Another selector 1623 receives the output of the selector 1622 and the zero, and selects one of the two inputs according to a parameter DMPX4. An operator 1618 multiplies the edge emphasis quantity USM$_{7-0}$ with the edge emphasis coefficient ED$_{17-10}$ and divides the product with 128 to output USM$_{17-10}$. The above-mentioned processing according to parameters DMPX2–DMPX4 is not related to the full color standard mode.

Selectors 1626 and 1627 receive DMPX5 and DMPX6, respectively, from the controller 1601. Then, image data for printing are selected as VIDEO$_{17-10}$ among normal pixel data SD$_{7-0}$, data FSD$_{7-0}$ subjected to smoothing and MIN$_{7-0}$ output from the selector 1614, according to the control signals DMPX5 and DMPX6 determined as shown in Table 1 according to the type of pixel. An adder 1624 adds the edge emphasis quantity USM$_{17-10}$ to the pixel data VIDEO$_{17-10}$ and outputs the sum as VIDEO$_{27-20}$.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:

an image reader reading a color image and providing first color data on the color image, said image reader comprising pixels aligned along a direction, the first color data obtained at each pixel including a plurality of data for different wavelengths from each other;

a phase shift device which generates second color data by shifting a phase of a first data for a first wavelength in the first color data by a first shift amount in the direction and by shifting a phase of a second data for a second wavelength shorter than the first wavelength in the first color data by a second shift amount in the direction;

a first operator for calculating first chroma data according to the first color data received from said image reader;

a second operator for calculating second chroma data according to the second color data received from said phase shift device;

a selector for selecting the first chroma data received from said first operator or the second chroma data received from said second operator according to predetermined conditions; and an image processor for processing the color image according to the first or second chroma data selected by said selector.

2. The image processor according to claim 1, wherein said image reader comprises three linear CCD sensors for three colors of red, green and blue.

3. The image processor according to claim 2, wherein the first data in the first color data is data on red, and the second data in the first color data is data on blue.

4. The image sensor according to claim 1, further comprising:
a plurality of said phase shift devices and a plurality of said second operators each for calculating second chroma data according to the second color data received from one of said phase shift devices, the first and second shift amounts used by said phase shift devices are different from each other, wherein said selector selects one of the first chroma data received from said first operator and a plurality of the second chroma data received from said second operators according to predetermined conditions.

5. The image processor according to claim 1, wherein said image processor discriminates an edge of a black portion in the color image.

6. The image processor according to claim 5, wherein said image processor discriminates an inside and an outside of a black portion in the color image.

7. The image processor according to claim 6, wherein said image processor changes of a duty ratio of image data for exposing a photoconductor in an electrophotographic process between the inside and the outside of a black portion in the color image.

8. The image processor according to claim 1, wherein said phase shift device shifts the phase of the longer wavelengths data in the main scan direction by ¼ pixel relative to that of the shorter wavelength data.

9. The image processor according to claim 1, wherein said phase shift device shifts the phase of the first data by ½ pixel in the main scan direction relative to that of the second data.

10. A method for processing an image, comprising the steps of:
reading a color image with pixels aligned along a direction, and providing first color data on the color image, the first color data obtained at each pixel including a plurality of data for different wavelengths from each other;

generating second color data by shifting a phase of a first data for a first wavelength in the first color data by a first shift amount in the direction and by shifting a phase of a second data for a second wavelength shorter than the first wavelength in the first color data by a second shift amount in the direction;

calculating first chroma data according to the first color data;

calculating second chroma data according to the second color data;

selecting the first chroma data received from said first operator or the second chroma data according to predetermined conditions; and processing the color image according to the first or second chroma data selected.

11. The image processor according to claim 4, wherein said selector selects one of the first and second chroma data having a lower chroma.

* * * * *

UNITED STATES PATENT AND TRADEMARK OFFICE
CERTIFICATE OF CORRECTION

PATENT NO. : 5,867,285
DATED : February 2, 1999
INVENTOR(S) : Hirota et al.

It is certified that error appears in the above-indentified patent and that said Letters Patent is hereby corrected as shown below:

In the Claims:

Add claim 12 (1st occurrence) as follows:
--12. The image processor according to claim 4, wherein said first and second operators calculate the first and second chroma data as a different between a maximum and a minimum of data in the first color data and in the second color data.--

Signed and Sealed this

Third Day of April, 2001

Attest:

NICHOLAS P. GODICI

Attesting Officer

Acting Director of the United States Patent and Trademark Office